(12) United States Patent
Robinson et al.

(10) Patent No.: US 7,772,013 B2
(45) Date of Patent: Aug. 10, 2010

(54) ENHANCEMENT OF SECOND-ORDER NON-LINEAR OPTICAL SUSCEPTIBILITIES IN ORGANIC FILM MATERIALS USING NON-CENTROSYMMETRIC NANOPARTICLES

(75) Inventors: Hans D. Robinson, Blacksburg, VA (US); James R. Heflin, Jr., Blacksburg, VA (US); Richey M. Davis, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 532 days.

(21) Appl. No.: 11/842,946

(22) Filed: Aug. 21, 2007

(65) Prior Publication Data
US 2008/0044148 A1    Feb. 21, 2008

Related U.S. Application Data

(60) Provisional application No. 60/838,870, filed on Aug. 21, 2006.

(51) Int. Cl.
G01N 33/551 (2006.01)
G01N 33/553 (2006.01)

(52) U.S. Cl. .................. 436/524; 436/525; 436/527
(58) Field of Classification Search ............... None
See application file for complete search history.

(56) References Cited

U.S. PATENT DOCUMENTS

| | | | | |
|---|---|---|---|---|
| 4,935,292 | A * | 6/1990 | Marks et al. | 428/220 |
| 5,512,218 | A * | 4/1996 | Gresser et al. | 264/1.34 |
| 2002/0127563 | A1* | 9/2002 | Salafsky | 435/6 |
| 2004/0146460 | A1* | 7/2004 | Salafsky | 424/9.6 |
| 2005/0118731 | A1* | 6/2005 | Salafsky | 436/518 |

* cited by examiner

Primary Examiner—Christopher L Chin
(74) Attorney, Agent, or Firm—Whitham Curtis Christofferson & Cook, PC

(57) ABSTRACT

A non-linear optical material comprising a plurality of non-centrosymmetric nanoparticles juxtaposed to non-linear optical (NLO) film at a localized surface Plasmon resonance (LSPR) of the nanoparticles. The LSPR is resonant at a wavelength of an incident light source, wherein a second-order non-linear susceptibility ($\chi(2)$) of the NLO film with respect to the incident light is enhanced by the juxtaposition to the LSPR of the nanoparticles. The non-linear optical material lacks global inversion symmetry.

26 Claims, 19 Drawing Sheets

ENHANCEMENT OF SECOND-ORDER NON-LINEAR OPTICAL SUSCEPTIBILITIES IN ORGANIC FILM MATERIALS USING NON-CENTROSYMMETRIC NANOPARTICLES

This patent application claims priority from U.S. Provisional application 60/838,870 filed on Aug. 21, 2006, which is incorporated by reference herein.

BACKGROUND OF THE INVENTION

1. Field of the Invention

The present invention generally relates to second-order non-linear optical (NLO) materials and in particular to ionic self-assembled multilayer (ISAM) films, and more particularly to fabrication techniques for these films.

2. Background Description

I. Background Summary

Second-order non-linear optical materials are at the heart of telecommunications devices such as electro-optic modulators and optical switches, and in lasers such as high power green and blue solid state lasers and optical parametric amplifiers.

Conventional NLO materials generally consist of inorganic crystals such as KTP, $LiTaO_3$ and $LiNbO_3$. While they are quite efficient, high quality crystals of sufficient size are expensive and difficult to manufacture. Organic NLO materials provide an alternative with the potential to provide high non-linear susceptibilities in an economical fabrication process. NLO materials based on ionic self-assembled multilayer (ISAM) films are particularly promising because of the ease of tailoring noncentrosymmetric structures and the long-term stability. These films are made by alternately immersing a substrate in two solutions, containing a polycation and a polyanion, respectively. If the substrate initially carries negative surface charges, dipping in the polycation solution will result in a nanoscale polymer layer self-assembled on the substrate, yielding a positively charged substrate. Subsequent dipping in the polyanion solution results in a second layer of the polyanion formed on top of the first layer. The process can be repeated as many times as desired, building up films to arbitrary thickness with nanoscale precision. ISAM films may have substantial second-order non-linear susceptibility ($\chi^{(2)}$) values, comparable to that of lithium niobate. Various methods have been suggested to improve the effective $\chi^{(2)}$ of these films by modifying their composition.

Nanoparticles made from noble metals such as silver or gold have recently attracted considerable attentions due to their unusual optical properties which enable light to be controlled in unique new ways. The interaction of light with the free electrons in such particles gives rise to collective oscillations of the conduction electrons at optical frequencies, known as localized surface plasmon resonances (LSPRs). When excited in this fashion, the particles act as nanoscale antennas, concentrating the electromagnetic (E-M) field into very small volumes adjacent to the particles. Exceptionally large enhancements in E-M intensity can be obtained this way, by as much as a factor of $10^4$ in individual particles, and $10^5$ in dimers (i.e. two closely spaced particles linked together). Enhancements as large as $10^7$ have been reported in nanoparticle clusters, enabling, for example, Raman spectroscopy of single molecules.

Other than Raman spectroscopy, this phenomenon has found applications in optical third-harmonic generation, as well as in second-harmonic generation, which is the subject of this disclosure. Nahata et al., *Optics Letters* 2003, 28, (6), 423-425), demonstrated an ~$10^4$ fold increase in the efficiency of optical second-harmonic generation from concentric silver ring structures centered around a 200-nm aperture (bull's-eye structure) compared to a silver film with an unadorned aperture. Podlipensky et al., *Optics Letters* 2003, 28, (9), 716-718, observed second harmonic generation (SHG) enhancement from ellipsoidal silver nanoparticles in a glass matrix grown by means of $Ag^+$—$Na^+$ ion exchange. More recently, Moran et al., *J. Phys. Chem. B* 2005, 109, (10), 4501-4506, have demonstrated second harmonic excitation spectroscopy of silver nanoparticle arrays, which were fabricated by nanosphere lithography. In that work, a weak out-of-plane LSPR mode was made to overlap with the second harmonic of the incident laser, so that the resulting SHG emission signal became proportional to the plasmon enhancement.

All of these studies used the nanoparticles in a dual role—as concentrators of the electromagnetic field, and as the NLO media. Since the $\chi^{(2)}$ values of noble metals are very small, this gives rise to only modest non-linear effects. In order to maximize the NLO efficiency, a better approach would be to combine the nanoparticles with a different material with an already strong NLO coefficient, as was envisioned by Pendry et al., *J. IEEE Transactions on Microwave Theory and Techniques* 1999, 47, (11), 2075-2084. Previous studies have used this approach to achieve high third-order NLO susceptibilities, where simple mixing of the two components is sufficient to obtain the enhancement. It is more difficult to implement this idea for second order NLO effects, since the material is required to lack global inversion symmetry, which therefore means that a random mixture will have $\chi^{(2)}=0$.

II. Background Detail

II.A. Second Order Nonlinear Optics

In order to possess nonzero second order nonlinear optical susceptibilities, a material must lack a center of inversion at the macroscopic level. The macroscopic second order susceptibility, $\chi^{(2)}$ governs the nonlinear polarization P of the medium at frequency $\omega_3$ in response to (optical) electric fields E at frequencies $\omega_1$ and $\omega_2$ through $$P_i^{\omega_3}=\chi_{ijk}^{(2)}(-\omega_3;\omega_1,\omega_2)E_j^{\omega_1}E_k^{\omega_2} \quad (1)$$

in which the subscripts refer to the directions of polarization of the fields. Second order nonlinear effects governed by Eq. 1 include second harmonic generation (where $\omega_1=\omega_2=\omega$, so that radiation $\omega_3=2\omega$ is generated at twice the frequency of the incident radiation) and the electro-optic (EO) effect (where $\omega_1=\sim 0$, so that $\omega_2=\omega_3=\omega$). In the EO effect, the static field creates a change in the index of refraction at frequency $\omega$. An example of an important $\chi^{(2)}$ application is the Mach-Zehnder waveguide modulator in which light is coupled from an optical fiber into the waveguide from the left, and the branch separates the signal into two beams of equal intensity. Due to the electro-optic effect, the refractive index of one arm changes in response to the application of a dc or ac voltage. This changes the optical path length of that arm and modulates the optical signal at the output end because of interference with the light from the other arm. The voltage required to vary the output from maximum value to zero is called the halfwave voltage ($V_\pi$) and is related to the electro-optic coefficient $r_{33}$ by $$V_\pi=(d\lambda)/(Ln^3 r_{33}) \quad (2)$$

in which d is the waveguide thickness, $\lambda$ is the wavelength, L is the waveguide arm length, n is the refractive index, and $r_{33}$ is proportional to $\chi^{(2)}$. The most common second order NLO materials are ferroelectric, inorganic crystals such as potassium dihydrogen phosphate (KDP), beta-barium borate (BBO), and lithium niobate, this last having a $\chi^{(2)} = 200 \times 10^{-9}$ esu and electro-optic coefficient $r_{33}=30$ pm/volt. Growth of such high-quality inorganic crystals, however, is difficult, time-consuming, and expensive.

II.B. Organic NLO Materials

The $\chi^{(2)}$ of an ISAM film is related to the molecular hyperpolarizability ($\beta$), chromophore number density (N), dipole tilt angle relative to the film normal vector ($\psi$), and a local field factor effect (F) by:

$$\chi^{(2)} = NF\beta \langle \cos^3 \psi \rangle \quad (3)$$

Rational design thus involves choosing a chromophore with a suitably high $\beta$ and incorporating it into a film with high density N and low tilt angle $\psi$. As a result of the multitude of frequency conversion, optical modulation, and optical switching applications that stem from the $\chi^{(2)}$ second order susceptibility, several methods for creating noncentrosymmetric materials incorporating organic molecules with large $\beta$ molecular susceptibilities have been developed. These include electric field poled polymers, Langmuir-Blodgett (L-B) films, and covalent self-assembled monolayer structures.

There has been extensive effort for the past two decades in the area of poled polymers, which consist of a glassy polymeric matrix that contains an NLO chromophore either as a guest dopant or as a covalently bonded substituent. Polar order is achieved by orienting the chromophores with an electric field when the material is above the glass transition temperature. The exceptional potential of organic electro-optic materials is illustrated by the demonstrations in poled polymers of full optical modulation at <1.0 V and >150 GHz. While the eventual randomization of the orientation back to the isotropic state has proven a challenging problem, advances continue to be made through use of higher $T_g$ hosts, covalent attachment of the chromophore to the polymer, cross-linked polymers, and dendrimeric structures. Recent materials have shown stability for >1000 hours (42 days) at 85° C. Noncentrosymmetric L-B films with $\chi^{(2)}$ values as large as $760 \times 10^{-9}$ esu have been fabricated, ~4 times larger than that of $LiNbO_3$. However, L-B films tend to possess poor mechanical and thermal stabilities owing to the relatively weak van der Waals interactions between layers. Alternatively, several variations have been developed for growth of polar, self-assembled multilayers using siloxane chemistry, but they suffer from long deposition times. A recent procedure can deposit one monolayer in 40 min with $\chi^{(2)} = 430 \times 10^{-9}$ esu, clearly an improvement over early approaches, but still impractical for most applications.

Ionic self-assembled multilayer (ISAM) films are a novel class of materials that allows detailed structural and thickness control at the molecular level, combined with ease of manufacturing and low cost. The ISAM method simply involves the alternate dipping of a charged substrate into an aqueous solution of a polycation and an aqueous solution of a polyanion at room temperature. High vacuum, high temperature, organic solvents, or clean-room facilities are not required. The film growth requires that the materials for each successive layer possess multiple charges so that the surface charge on the substrate can be reversed (e.g., from positive to negative) as each layer is adsorbed. The dipping can be repeated to produce a film with as many bilayers as desired. ISAM films are highly robust, rapidly deposited (typically complete in ~1 minute), and applicable to a vast array of materials that enables wide tuning of refractive index and total thickness. We and others have demonstrated that ISAM films can be fabricated into noncentrosymmetric structures for $\chi^{(2)}$ applications. Using commercial ionic polymeric dyes and an NLO-inactive polycation, we have produced ISAM thin films with a noncentrosymmetric arrangement of NLO chromophores that yields $\chi^{(2)}$ values comparable to that of quartz, $\sim 1 \times 10^{-9}$ esu, with exceptional temporal and thermal stability. The films have exhibited no measurable decay of $\chi^{(2)}$ over a period of more than nine years at 25° C. and more than 18 hours at 150° C.

II.C. Plasmonics

Surface plasmon polaritons (SPPs) are electromagnetic modes that travel along the interface between a metal and a dielectric. The electric field of an SPP has its maximum value at this interface and decays exponentially into the dielectric over a distance comparable to the wavelength ($\lambda$), and into the metal over a distance comparable to the skin depth. Just as an electric circuit or a microwave cavity often has one or more resonances, a metallic nanoparticle generally possesses one or more plasmonic resonances, known as localized surface plasmon resonances (LSPRs). The number and frequencies of the LSPRs depend sensitively on the geometry of the nanoparticles along with any coupling to nearby structures. For instance, small spherical nanoparticles have an LSPR that is roughly independent of size, but shifts towards the red if the particle is elongated into a rod, decorated with appendages, or transformed into a cage structure. In this manner, LSPRs of any frequency in the visible, infrared, or below can be achieved, which is important for tuning LSPRs for use at desired wavelengths.

In a manner analogous to the operation of radio antennas, metal nanostructures can concentrate electromagnetic energy into a SPP or LSPR. The ratio of the maximum electric field in the plasmon mode to the field of the free-space wave is referred to as the enhancement factor (g), and it can take on very large values. Even in the simple case of an SPP excited in a thin metal film, g can reach values of 100-200. More interestingly, $g \sim 10^4$ has been measured in nanoparticle arrays, fabricated using a technique known as nanosphere lithography. In nanoparticles dimers, g is predicted to reach values as large as $10^5$. Finally, the largest g ever observed, although controversial, is a colossal $10^7$ or larger, seen in nanoparticle clusters.

This kind of concentration of the electromagnetic field is today used routinely in surface-enhanced Raman spectroscopy (SERS), making Raman measurements of a very small amount of material possible. Even though the mechanism behind Raman scattering is very different from that of second order nonlinear effects, they are alike in that the efficiency in both cases scales as $g^2$. Therefore, plasmonics could become as important to nonlinear optics as it already is to Raman spectroscopy. Such a development has already been anticipated by Pendry et al., who have shown theoretically that if resonant metal structures, smaller than the wavelength $\lambda$ in size, are filled with a nonlinear material and arranged properly in a transparent medium, the result is a material with a substantially larger nonlinear coefficient than that of the underlying nonlinear filler. While there is a fair amount of ongoing work aimed at exploiting plasmonics for third-order nonlinear applications, most work on second order effects has been limited to investigating the enhancement of SHG from the metal structures themselves, which is inherently a weak effect.

II.D. Metallic Nanoparticles

The surface charge of gold and silver, which are the metals generally used in plasmonics, can be easily controlled in an aqueous solution to be either negative or positive. Thus, ISAM films assemble readily on such surfaces, precisely at the location of the greatest plasmonic field enhancement, and most of the benefit can generally be gained by depositing no more than a few dozen ISAM bilayers. This combination of surface deposition and surface field enhancement makes the marriage of plasmonics with ISAM films potentially extremely fruitful. There are several important design characteristics for metal nanoparticles in organic NLO materials:

The particle LSPR needs to be tunable in the wavelength range of ~1000-1600 nm.

The nanoparticles should be <200 nm in size so that they can be arranged to minimize light scattering from the materials.

The particle size distribution needs to be as narrow as possible in order to tune the surface plasmon at a particular wavelength and permit effective assembly of particle clusters in layer-by-layer assembled films.

While several methods exist for predicting surface plasmon effects of metal particles as a function of composition, size, shape, and dielectric properties of the particles surroundings, experimental studies still provide the main guidance for designing metal nanoparticles for surface plasmon applications. In particular, two methods—chemical reduction of soluble gold and silver salts in the presence of shape-selecting capping agents and photochemical assembly of silver particles into nanoprisms—have been used to synthesize particles with surface plasmons in the wavelength range 900-1600 nm. Chemical reduction methods include reducing $AgNO_3$ with ethylene glycol in the presence of the nonionic polymer polyvinylpyrollidone (PVP) which acts as a capping agent and as a steric stabilizer. By controlling reagent concentrations, specific shapes can be selected such as wires, nanoprisms, and nanocubes. Theses nanoparticles can be subsequently converted into hollow gold/silver structures. In particular, gold/silver nanocages have been made with dipolar surface plasmon peaks that could be tuned to wavelengths up to 1200 nm. In related work, gold nanoprisms have been produced by the reduction of chloroauric acid by salicylic acid to form gold nanoprisms with edge lengths in the 100-200 nm range and with surface plasmon peaks that range from 1000-1300 nm These nanoprisms were negatively charged and incorporated into ISAM films although NLO effects were not probed. In a variation on this approach, gold nanoprisms were produced by seeding preformed spherical gold particles in chloroauric acid with various reagents including ascorbic acid as a capping agent and cetyltrimethylammonium bromide. High yields of gold nanoprisms resulted with edge lengths in the 50-200 nm range and surface plasmon peaks in the 800-1400 nm range. The seeded growth has also been used with silver particles in a photochemical process in which silver nanospheres made by reduction of $AgNO_3$ using sodium citrate were assembled into silver nanoprisms using controlled irradiation at multiple wavelengths in the range 450-750 nm to select for particles with surface plasmons at wavelengths 800-1500 nm. It has been hypothesized that the controlled irradiation affects the charge distribution on the particle's surface which directs assembly into nanoprisms although the precise mechanism is still not understood.

Metallic nanoparticles can also be fabricated lithographically as well as through chemical synthesis. This can be done through standard lithographic techniques such as optical lithography or electron-beam lithography, or through newer techniques such as nanosphere lithography (NSL). In standard lithography, a substrate is coated with a uniform layer of a resist, which is then lithographically patterned and developed, exposing areas of the substrate where the nanoparticles are meant to be fabricated. Metal is then vacuum deposited onto the substrate, after which the resist is dissolved in an appropriate solvent, which causes the metal deposited onto the resist to lift off from the sample, leaving only the nanoparticles behind. In NSL, the resist is replace with a close packed layer of nanospheres, and metal is vacuum deposited directly onto these sphere. The spheres are then dissolved, leaving a regular array of nanoparticles on the surface.

In summary, several techniques demonstrate facile methods for the synthesis of gold and silver nanoparticles with surface plasmons in the wavelength range of interest and with surface chemistries that are amenable for ready incorporation into organic ISAM films.

However, the prior art detailed above does not provide what is needed, namely, a low cost material having $2^{nd}$ order non-linear optical (NLO) susceptibilities ($\chi^{(2)}$) that are dramatically larger than those in conventional materials.

SUMMARY OF THE INVENTION

This invention develops a new class of nano-structured materials that have $2^{nd}$ order non-linear optical (NLO) susceptibilities ($\chi^{(2)}$) that are dramatically larger than those in conventional materials. These materials can be integrated into electro-optic devices (such as optical switches and modulators) with correspondingly higher performance and reduced device dimensions. These materials are hybrids between non-linear organic films (e.g. fabricated with self-assembly as ionic self-assembled multilayer films, or ISAM films) and metallic nanoparticles. The ISAM films constitute the underlying NLO material, while surface plasmon resonances in the nanoparticles concentrate the electromagnetic field strength, significantly enhancing the effective $\chi^{(2)}$ of the material. Since this field concentration only extends a few nanometers from the nanoparticles, and ionic self-assembly forms conformal films with nanometer thickness, this combination is an exceptionally powerful match. Such a film, only a few nm thick, replaces a micron-thick conventional ISAM NLO film.

The new materials, which we will term Metal Organic Hybrid ISAMs (MOH-ISAMs), exploit the same phenomenon that has allowed surface enhanced Raman spectroscopy (SERS) to revolutionize Raman spectroscopy over the last 20 years. Thanks to SERS, it is today possible to perform Raman spectroscopy, which is intrinsically a very low signal technique, on minute samples, even as small as a single molecule. Even though SERS is becoming a well-established technique, plasmonic enhancement has not previously been used to enhance second order NLO materials. This is because these new materials must lack a global inversion center, which requires careful design of the overall materials structure—a simple mixture of nanoparticles and NLO material will therefore have $\chi^{(2)}=0$. Furthermore, incorporation of metal nanoparticles into bulk $\chi^{(2)}$ films will only lead to small enhancements since the majority of the nonlinear material will not be within a few nanometers of the nanoparticles. By attending to these issues as hereinafter described, it is likely that plasmonics will have as profound an influence on NLO materials as it already has had on Raman spectroscopy.

Second order NLO materials are of great technological importance, as they are at the heart of optical switches and modulators that send and route information across long distance communications networks, including the Internet. The active material in commercial devices of this type are crystals of inorganic materials such a lithium niobate or beta barium borate. While these work well, they are expensive and cumbersome to manufacture, and possess relatively low $\chi^{(2)}$ values. By contrast, the materials proposed by the invention are inexpensive and easy to manufacture, and promise orders of magnitude improvement in $\chi^{(2)}$ values, where even slight improvements would already be of technological interest. Modulators based on organic NLO materials have several additional advantages over their conventional counterparts. Bandwidths in excess of 150 GHz with modulating voltages <1 V have been demonstrated. ISAM based NLO materials are also stable on the time scale of many years. Furthermore, the manufacturing process is ideal for inclusion into integrated photonics circuits; it forms thin films that are easy to deposit on surfaces, and the process takes place at low temperatures and requires no corrosive chemicals, making it compatible with existing silicon device fabrication infrastructure. The invention has the potential to revolutionize optical communication by ushering in optical switches, modulators, and frequency doublers (enabling red to blue light conversion economical enough to integrate with optical storage devices such as the next generation DVD players) that are both dramatically cheaper and faster than today's technology. Even more importantly, the high NLO coefficients of the new materials will allow the physical scale of devices to be reduced to the point where they are amenable to chip-level integration. This is an area where great effort is currently being expended, and when fully realized, this technology will make it economical to bring optical communications technology into the home, covering "the last mile" with fiber. NLO devices would constitute a significant addition to the toolbox of photonic devices that are amenable to integration, as they could potentially make >150 GHz communications bandwidth available at the consumer level.

In one embodiment, the invention enhances the effective second order non-linear susceptibility ($\chi^{(2)}$) of ionic self-assembled multilayer (ISAM) films, causing a film with just a few bilayers to be optically equivalent to a 700-1000 bilayer film under the prior art. Nanosphere lithography is used to deposit silver nanoparticles on the ISAM film, and the geometry of the particles is tuned to make their plasmonic resonances overlap the frequency of optical excitation. An enhancement in the efficiency of second harmonic generation (SHG) by as much as 1600 times has been observed using this approach. Further large improvements of the NLO properties may be obtained by using metallic nanostructures with stronger E-M field enhancing properties, and placing these more densely throughout the film. Further, the fabrication techniques taught by the invention substantially reduce the cost of producing the electro-optic devices which use the invention's hybrid films.

An aspect of the invention is a non-linear optical material comprising a plurality of non-centrosymmetric nanoparticles juxtaposed to non-linear optical (NLO) film at a localized surface Plasmon resonance (LSPR) of said nanoparticles, the LSPR being resonant at a wavelength of an incident light source, wherein a second-order non-linear susceptibility ($\chi^{(2)}$) of the NLO film with respect to the incident light is enhanced by the juxtaposition to the LSPR of the nanoparticles, the non-linear optical material not having global inversion symmetry.

Another aspect of the invention is a non-linear optical material formed of an ionic self-assembled multilayer (ISAM) film, the ISAM film having a non-zero second-order non-linear optical susceptibility $\chi^{(2)}$, and metallic nanoparticles deposited on the ISAM film, the metallic nanoparticles having one or more localized plasmon resonances (LSPRs), the LSPRs being determined by a geometry of the metallic nanoparticles. The geometry of the metallic nanoparticles is tuned to make at least one of the LSPRs overlap a frequency of optical excitation applied to the non-linear optical material, thereby enhancing a second harmonic generation (SHG) emission, responsive to the optical excitation, in proportion to an enhancement responsive to the plasmonic resonance. Consequently, the film can have relatively few bilayers, thereby reducing fabrication costs for the ISAM film. The metallic nanoparticles preferably are silver to maintain compatibility with technology for integrating the invention onto high density wafers. The metallic nanoparticles may be deposited by nanosphere lithography. The geometry of the metallic nanoparticles may be a triangular prism or a nanocage, or other structures usable to tune the resonance frequency of the nanoparticles.

In a different embodiment of the invention, the NLO material is rendered as a dispersion of aggregates of ISAM film and metallic nanoparticles. The requirement of a lack of global inversion symmetry is relaxed here, and only the individual aggregates are required to be non-centrosymmetric. The nanoparticles are stabilized to become stable and inert under biological conditions, and can be conjugated (i.e. appropriate molecules or protein can be chemically bound to it) with markers that allow the nanoparticles to bind to specific biological target molecules. This dispersion is then applied as a contrast agent in second harmonic imaging microscopy (SHIM). This is an emerging microscopy technique with applications in the fields of biology and biomedicine. It is very similar to the more established technique of two-photon excitation fluorescence (TPEF) microscopy, but yields information complementary to it.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
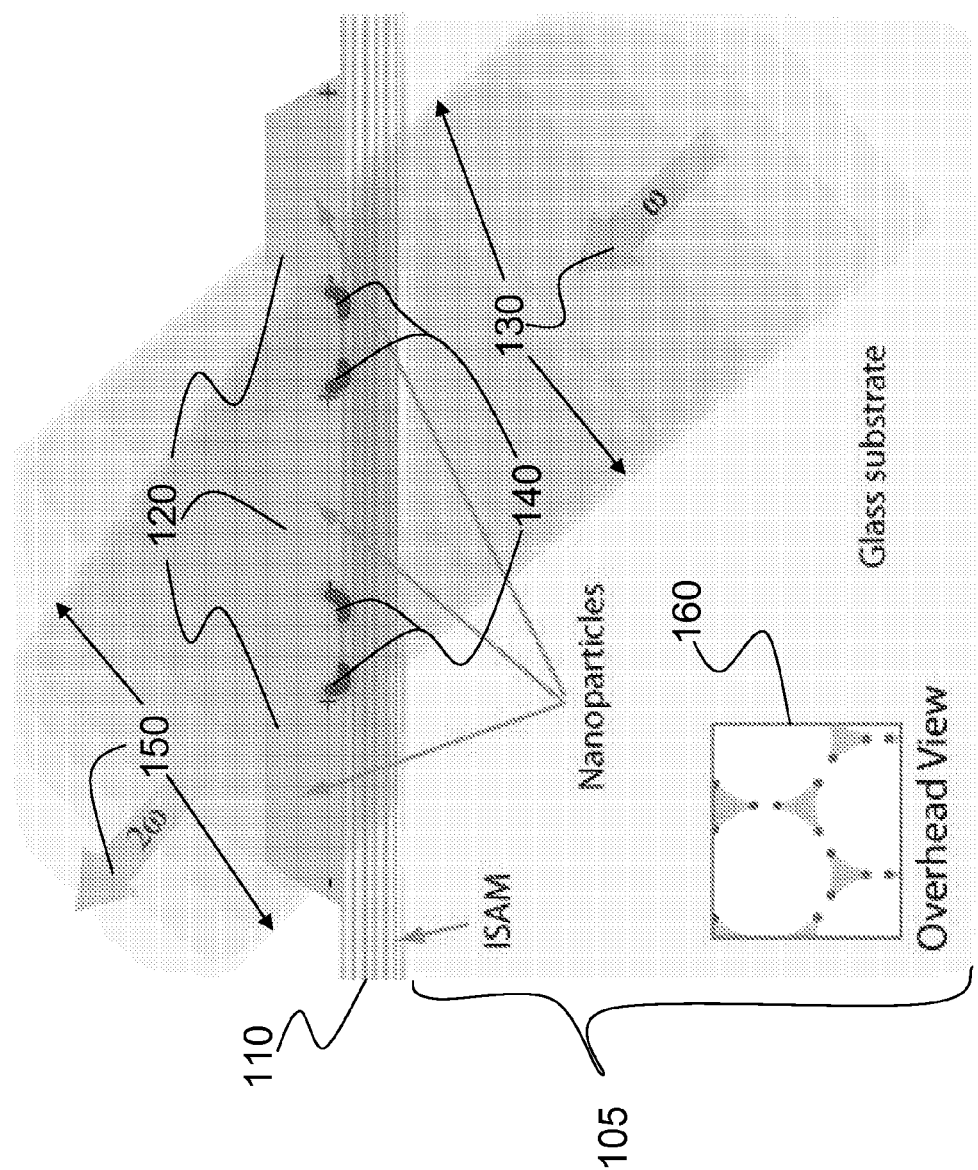
FIG. 1A is a schematic sideview of an ISAM+metal nanoparticle hybrid film.

The invention dramatically increases $\chi^{(2)}$ using plasmonic enhancement of organic NLO materials, where special care is taken to ensure inversion asymmetry. This is accomplished by the combination of inorganic non-linear films with metallic nanoparticles to yield particle/film juxtapositions that have very large second order non-linear response. This requires the particles to be non-centrosymmetric. An object is "centrosymmetric" if it remains unchanged (except for a translation) after an inversion operation has been applied to it. "Inversion" is the act of transforming a space by mapping the coordinates of each point in that space onto a new set of coordinates that equals the set of original coordinates by −1. Centrosymmetric symmetry is also known as inversion symmetry. A non-centrosymmetric object lacks this property. In its most generic scope, the invention achieves dramatic increases in $\chi^{(2)}$ through use of non-centrosymmetric particles in larger structures where care has been taken to preserve the lack of symmetry on a global scale. A material lacks global inversion symmetry if an inversion changes its macroscopic properties, that is, properties that remain constant and can be measured over arbitrarily long length scales (e.g. index of refraction, density, magnetization, polarization, etc.).

Embodiment 1

Nanoparticles Deposited on a Thin ISAM Film

The invention may be understood by considering several examples. One example is application of the invention to ISAM films. While ISAM films are remarkably stable, their NLO performance is too low for practical devices. The degree of net polar ordering that can be achieved with a polymeric dye ISAM film is limited by: 1) orientation of dipoles in opposite directions above and below the polymeric dye layer, resulting in partial cancellation; 2) random orientation of dipoles within thicker monolayers due to polymer loops; and 3) steric constraints on orientation since the relatively bulky chromophores are separated along the polymer backbone by only two carbon-carbon bonds. A preliminary step toward the invention is a new methodology for achieving a high degree of polar ordering of organic chromophores in thin films—a hybrid covalent-electrostatic self-assembled multilayer process. Our first examples used the dyes Procion Red MX-5B and Procion Brown MX-GRN, which are common textile reactive dyes having a dichlorotriazine moiety and two sulfonate moieties.

Polar order is achieved by alternating the mechanism of layer adsorption between covalent reaction and electrostatic attraction for a single pair of materials. Layer-by-layer films were constructed by alternately immersing the substrate into aqueous solutions of an NLO-inactive polymeric "glue"—poly(allylamine hydrochloride) (PAH)—and the reactive dye. The dichlorotriazine moiety is susceptible to nucleophilic attack and reacts with unprotonated amine groups at pH>9 at 25° C. Covalent attachment is rapid and complete within 2 minutes in unstirred solutions at 25° C. A PAH layer is then deposited electrostatically from a solution at a pH less than the $pK_a$ (~9), such that the amine groups are protonated. The key to obtaining a high degree of net polar order is that the covalent interaction occurs preferentially at the high pH of the dye solution while the electrostatic interaction occurs preferentially at the lower pH of the PAH solution, resulting in an orientation of the chromophore with the dichlorotriazine end directed towards the substrate and the sulfonates directed away. The $\chi_{zzz}^{(2)}$ values for films made with Procion Red and Brown were $11 \times 10^{-9}$ esu and $50 \times 10^{-9}$ esu, respectively, greater than that of typical polymeric ISAM films, and, in the case of Procion Brown, starting to approach that of $LiNbO_3$ ($\chi_{zzz}^{(2)} = 200 \times 10^{-9}$ esu). For the technologically important $r_{33}$ coefficient, Procion Brown films achieve half the value of $LiNbO_3$, 15 pm/V vs. 30 pm/V. See U.S. Pat. No. 6,953,607. The present invention builds upon this improved hybrid covalent/ionic self-assembly method.

One implementation of the invention is a hybrid structure of ISAM films and noble metal nanoparticles. Only one previous example of this is detailed in literature, by Clark et al., J. Am. Chem. Soc. 2000, 122, (41), 10234-10235, in which cellular membranes were used to provide a weakly anisotropic environment for embedded metal nanoparticles coated with NLO dyes, leading to a moderate (20-fold) increase in SHG conversion efficiency. By contrast, the approach of the present invention uses the inherently strong asymmetry of ISAM films to extract maximum advantage of the field concentrating properties of the LSPRs, as schematically shown in FIG. 1A, which is a schematic sideview of an ISAM+metal nanoparticle hybrid film 110 on glass substrate 105. A single layer of silver nanoparticles is subsequently deposited on top of the film. The particles were formed in situ using nanosphere lithography, a self-assembly technique in which a dispersion of mono-disperse polystyrene nanoparticles is drop-cast on a surface and allowed to dry. The surface tension of the drying droplet pulls the spheres into a close-packed monolayer. Silver is then evaporated onto the substrate, the spheres are dissolved, leaving behind a lattice of triangular silver nanoparticles. By adjusting the size of the polystyrene spheres and the thickness of the deposited silver, the fundamental LSPR can be adjusted as desired through visible and infrared frequencies. In our case, 720 nm diameter sphere where used, with silver deposited to a thickness of 50 nm. This centered the largest LSPR of the particle near 1064 nm, which is the operating wavelength of the pulsed Nd:YAG laser used to characterize the film. When excited at this resonance, the incident electromagnetic field is concentrated into small volumes around the corners of the triangle, with enhancement factors approaching 104. The optical non-linearities lead to second harmonic generation (SHG) of light at 512 nm. A beam of light 130 traverses a layer of nanoparticles 120 in the shape of triangular prisms. The localized intensity enhancement due to the LSPRs 140 leads to a commensurate increase in SHG light 150 from the ISAM film 110. Inset 160 shows a topview of the film 110.

Standard glass microscope slides were used as substrates 105 in the experiments. These slides were cleaned using the RCA cleaning process and then stored in deionized water until used. For the ISAM fabrication, PAH (poly[alylamine hydrochloride]) (10 mM; pH=7) was used as the polycation and PCBS (poly[carboxyhydroxyphenylazobenzenesulfonamidoethane diyl]sodium salt) (10 mM; pH=7) as the polyanion. ISAM films were built up on the slides by alternately dipping them in these two solutions, taking care to rinse them thoroughly in DI water between immersions. This naturally results in ISAM films on both sides of the slide. In the rest of this disclosure ISAM film thickness always refers to the thickness of the film on one side of the slide, even though both sides may be probed simultaneously.

Figure 1B:
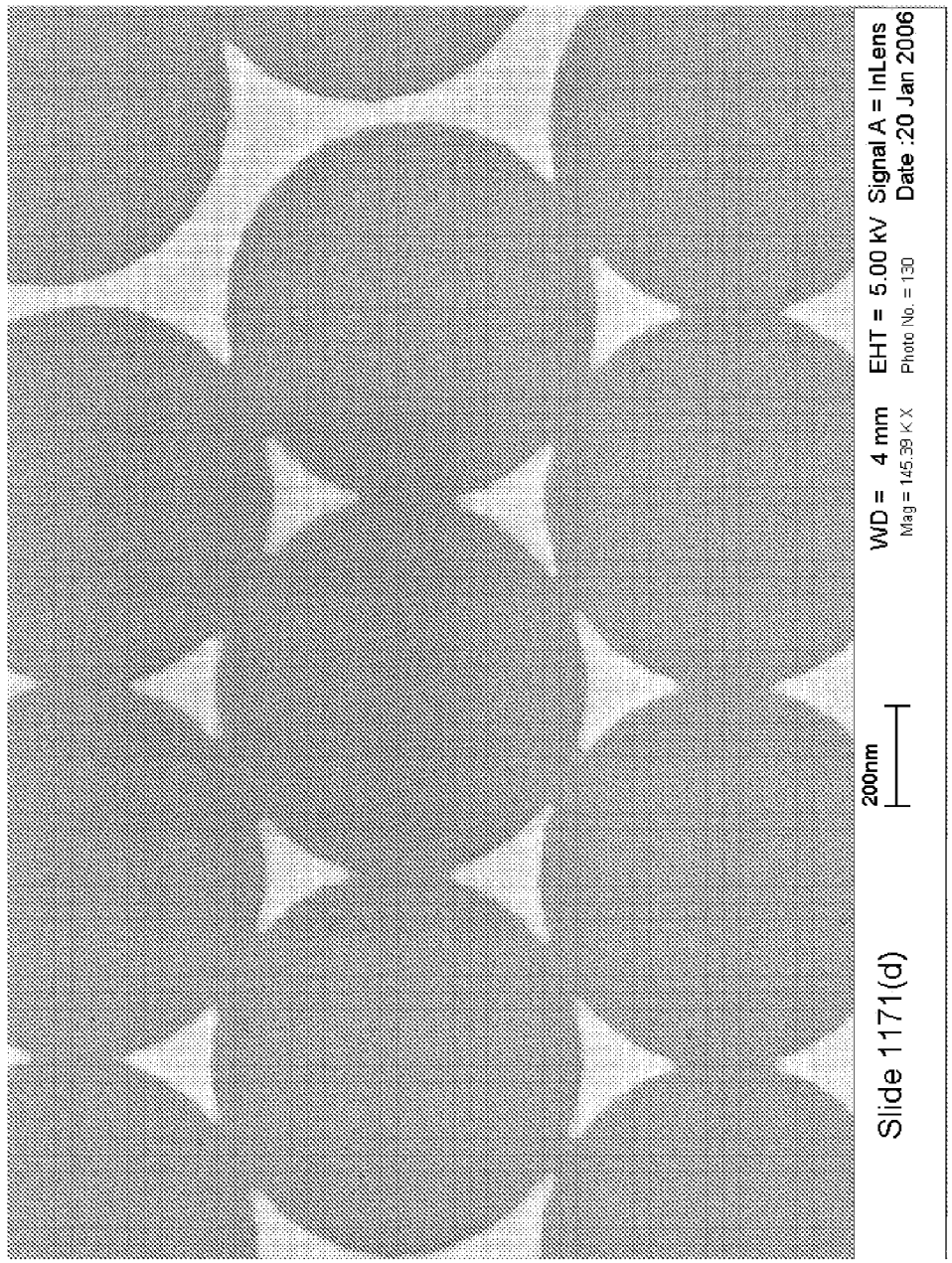
FIG. 1B is a Scanned Electron Microscopy (SEM) image of typical array of silver nanoparticles (bright phase) fabricated with nanosphere lithography.

Arrays of silver nanoparticles were fabricated on one side of the substrate, which were either bare, or first coated with NLO ISAM films. Nanosphere lithography (NSL) was used in this step, because it allows rapid and simple deposition of relatively uniform nanoparticles. In this technique, a dispersion of polystyrene nanospheres is drop-cast onto the substrates (in our case consisting of 3.8% 720 nm diameter spheres in DI water), and then allowed to dry. This causes the spheres to self-assemble into a close-packed monolayer. Silver is subsequently deposited onto the substrate using electron beam evaporation, after which the spheres are removed from the substrate by ultrasonication in dichloromethane for about 10 s. The non-linear properties of any underlying ISAM film are only marginally affected by this removal process. Since the deposited metal reaches the substrate only through the gaps in the close-packed film, this results in a honeycomb array of silver nanoparticles as shown in the micrograph in FIG. 1B, which is a Scanned Electron Microscopy (SEM) image of a typical array of silver nanoparticles (bright phase) fabricated with nanosphere lithography, using spheres 720 nm in diameter as templates (removed). Note that the pattern is the same as seen in the inset 160 in FIG. 1A.

In our work, the lateral dimensions of the nanoparticles were kept constant by the consistent use of 720 nm diameter nanospheres in all samples, while the optical properties of the particles were tuned by varying the thickness of the deposited metal from 30 to 100 nm.

Figure 2A:
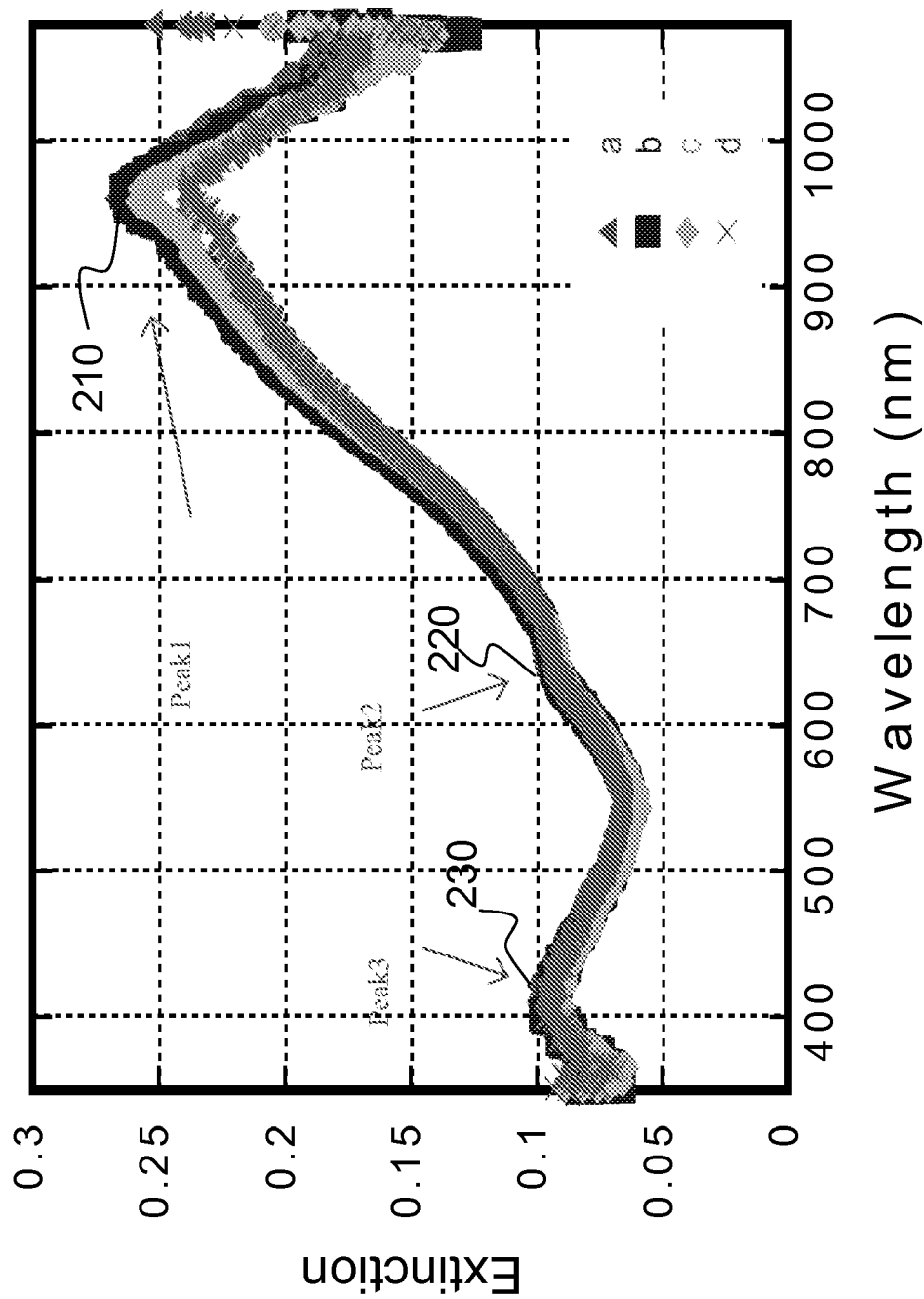
FIG. 2A is a graph showing extinction spectra of 50 nm thick silver nanoparticle arrays fabricated using NSL on glass slides.
Figure 2B:
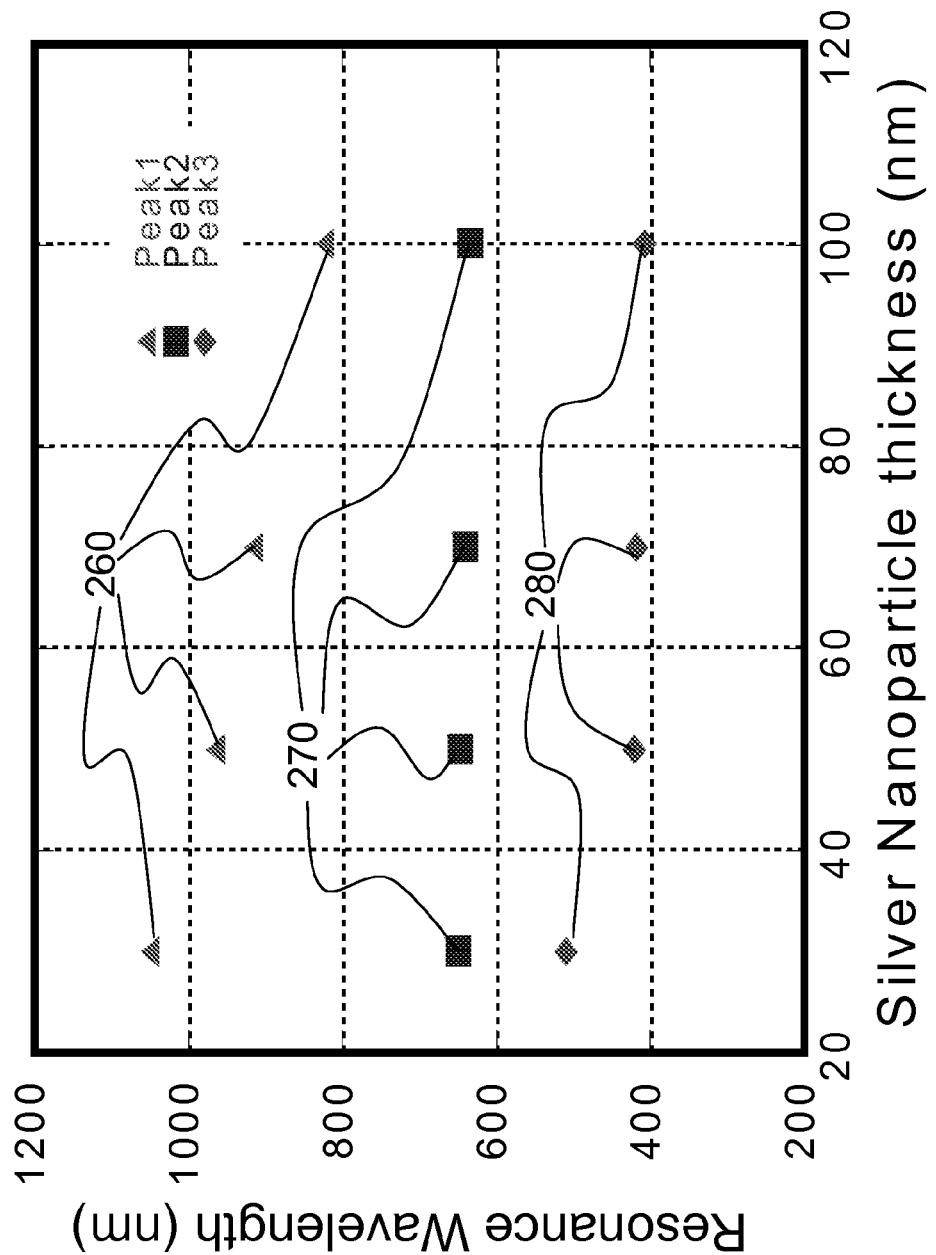
FIG. 2B is a graph showing center wavelength of the plasmon resonance wavelength as a function of silver nanoparticle thickness.
Figure 3:
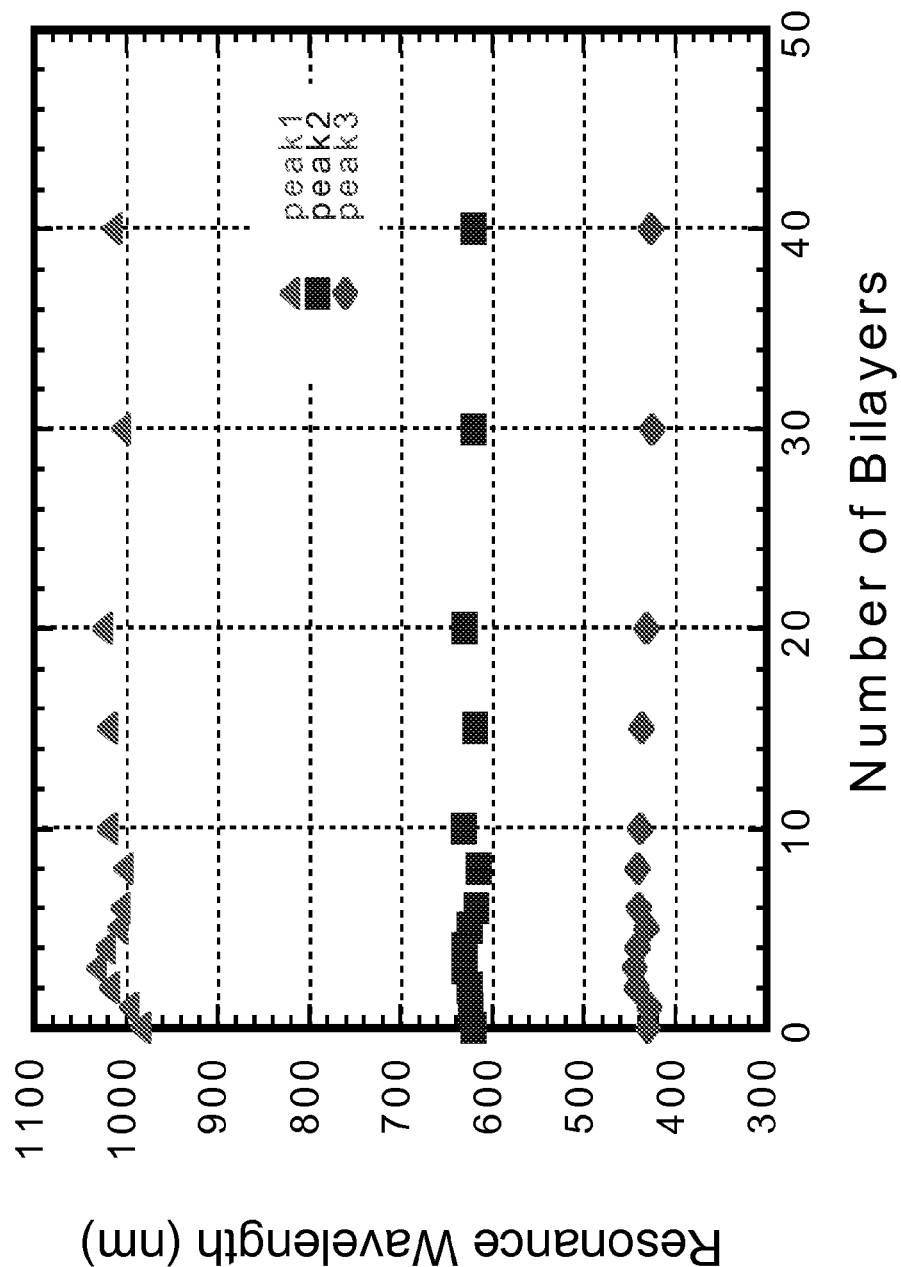
FIG. 3 is a graph showing center wavelengths of plasmon resonances in silver nanoparticle arrays fabricated using NSL on ISAM films of varying thickness.

The LSPRs of the nanoparticle arrays were characterized by measuring the extinction spectrum of light transmitted through the substrate. A tungsten lamp, producing white light incident on the sample with an intensity of 2.1 mW/cm$^2$ was used as excitation source. Typical extinction spectra of 50 nm thick silver nanoparticles deposited on a bare glass substrate are shown in FIGS. 2A and 2B. Three resonance peaks (labeled Peak1 210, Peak2 220 and Peak3 230) are seen in the wavelength range 350~1080 nm, as in FIG. 2A. The intensities and positions of the peaks vary a little for different spots on the same sample, which we ascribe to variations in the geometry of the nanoparticles across the substrate. Theoretical studies indicate that the three resonance bands can be attributed to the hybridization of dipole and quadruple modes, either in or out of the plane of the substrate. We tentatively ascribe the three peaks Peak1 210, Peak2 220 and Peak3 230 to out-of-plane dipole-like resonances, in-plane quadrupole-like resonances and out-of-plane quadrupole-like resonances, respectively.

FIG. 2B shows the effect of the nanoparticle thickness (x-axis) on the resonance center wavelengths (y-axix). It can be seen that for Peak1 260, the dominant resonance, the resonance wavelength blue-shifts strongly as the thickness increases, while the resonance wavelength of the other two peaks (Peak2 270 and Peak3 280) depend only weakly on the particle thickness. This is in agreement with theoretical calculations for these triangle-shaped silver nanoparticles, as well as with previous experimental observations. This effect provides a means to tune the LSPR wavelength to the desired operating band. In this disclosure, we exploit it to make the dominant resonance (Peak1 260) overlap with the 1064 nm laser wavelength used in the SHG experiments described below.

SHG was measured in a forward-transmission geometry using 11 ns long pulses from a Spectra-Physics Q-switched 10 Hz Nd:YAG, with a fundamental wavelength of 1064 nm as excitation source. The laser was incident on the sample with a spot ~1 mm in diameter. The transmitted light was filtered to remove the laser wavelength, and the remaining SHG light was detected by a photomultiplier tube. The incident angle was varied by rotating of the samples with a computer-controlled rotation stage, and the incident intensity and polarization was controlled using a pair of Glan-Taylor polarizers. The samples were fabricated as described above, using 72 nm thick nanoparticles. This thickness ensures a sufficient overlap between laser emission and LSPR.

Figure 4A:
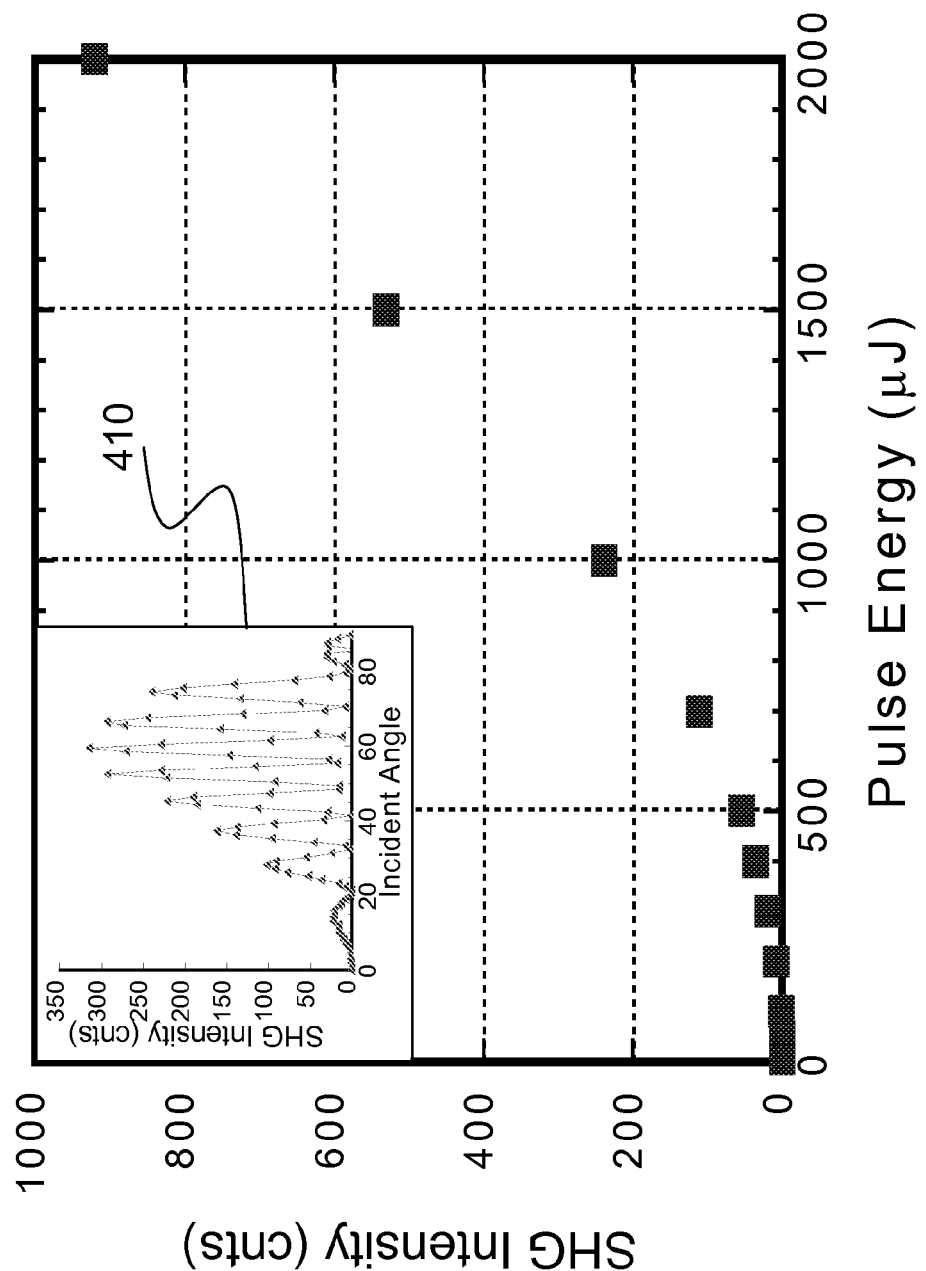
FIGS. 4A, 4B and 4C are graphs showing an SHG signal obtained from: (4A) conventional 40 bilayer PAH/PCBS ISAM film, (4B) nanoparticles deposited directly on a glass substrate, and (4C) hybrid ISAM+nanoparticles films compared to the data from FIGS. 4A and 4B.
Figure 4B:
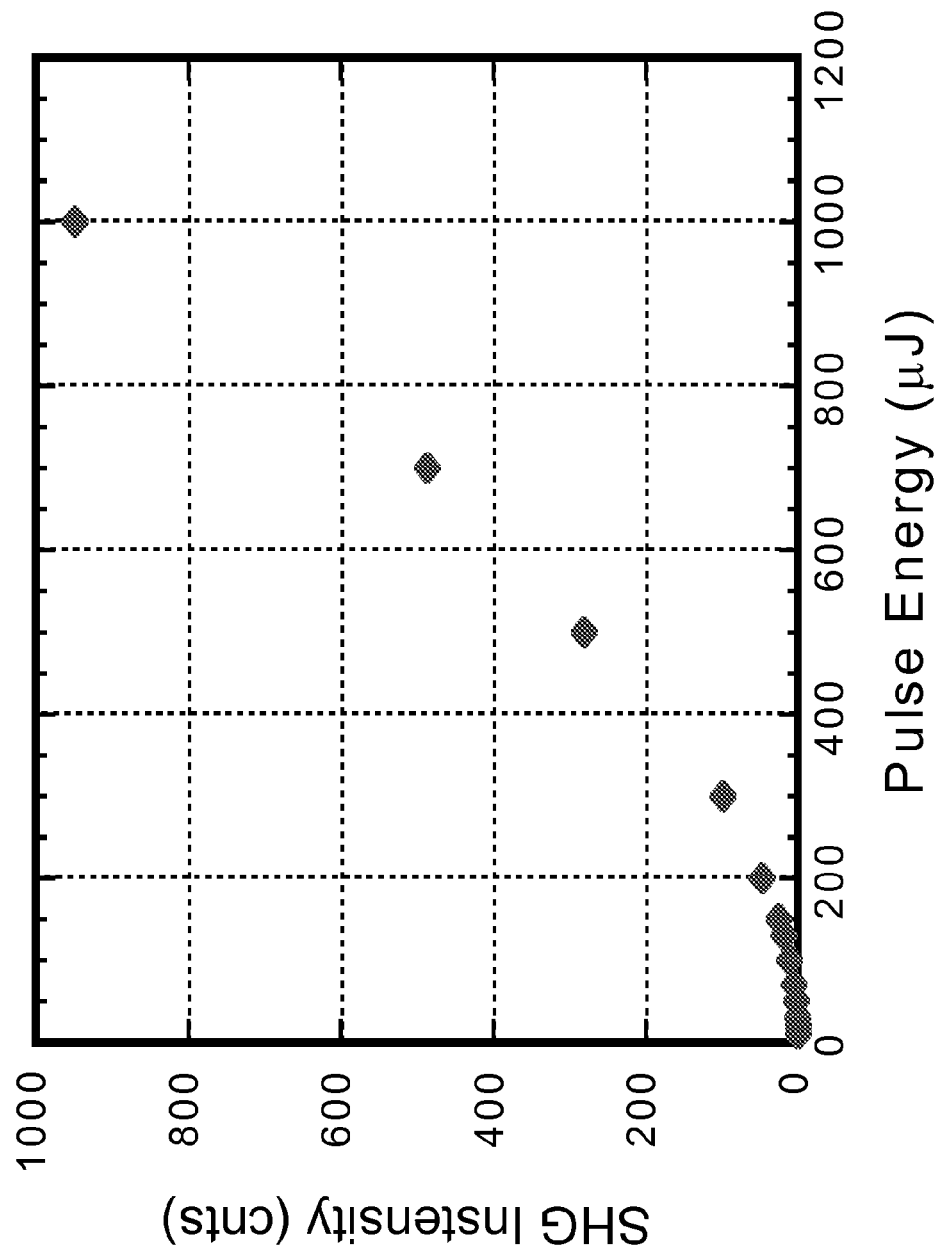
Figure 4C:
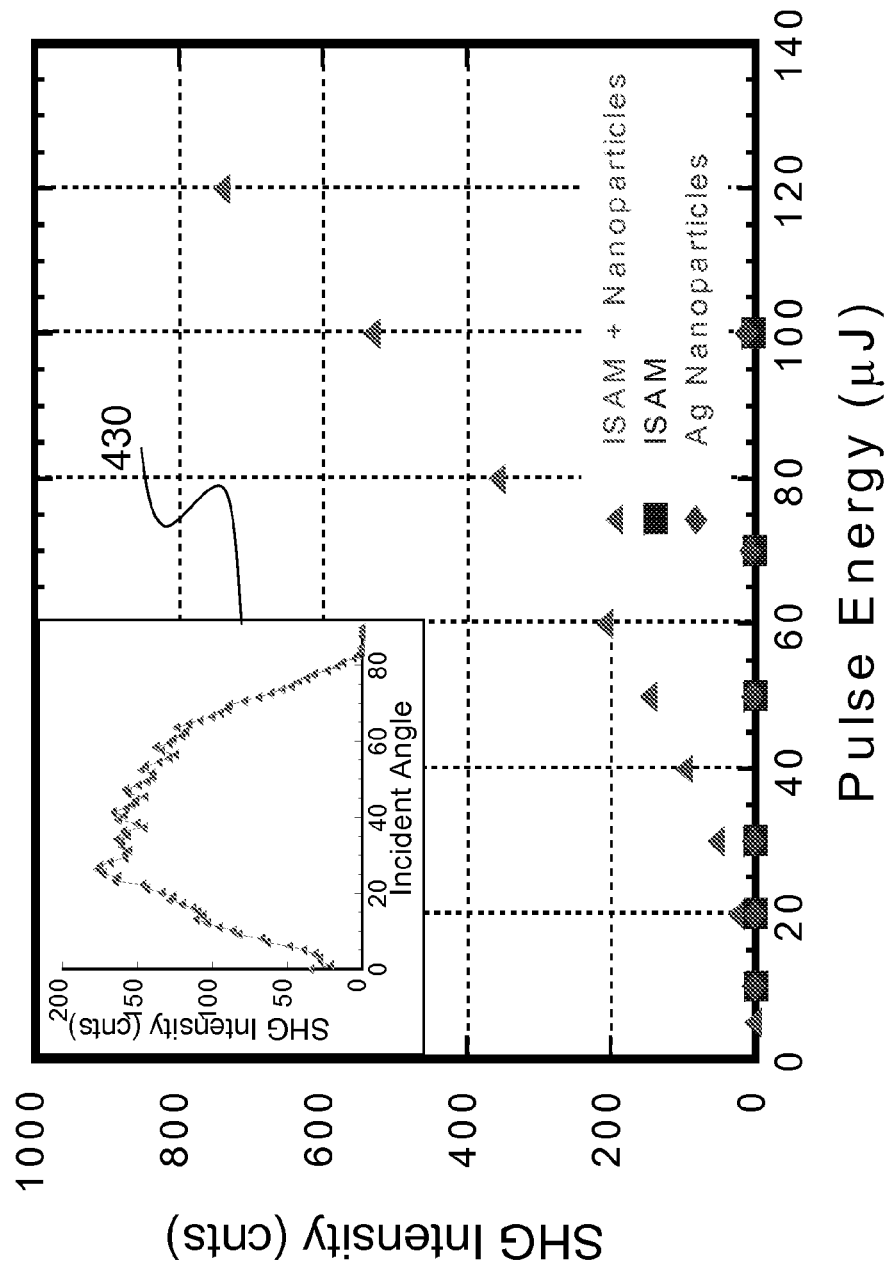

FIGS. 4A, 4B and 4C illustrate the enhancement in SHG conversion efficiency brought about by combining NSL nanoparticles and a 40 bilayer NLO ISAM film. The y-axes in the three graphs are the same, so as to make the data easier to compare. In all three cases, the SHG intensity varies as the square of the excitation energy, as expected. All data were taken at an angle of incidence close to 45°, except for conventional ISAM films. In those cases, the angle was adjusted for optimum phase matching, which occurs around 46°, and the resulting signal was divided by 4 to remove the effect of the film on the reverse side of the substrate. The SHG conversion efficiency is similar for a conventional ISAM film alone (FIG. 4A) and nanoparticles on a bare substrate alone (FIG. 4B). However, when the two are combined (FIG. 4C), a significantly lower excitation power is required to obtain the same SHG intensity. More precisely, the hybrid ISAM+nanoparticles film exhibits, in this case, over 200 times larger SHG conversion efficiency than either component alone. In fact, as the incident energy is increased in the hybrid ISAM+nanoparticles films, the sample burns, further illustrating the field-concentrating properties of the silver nanoparticles.

Figure 4D:
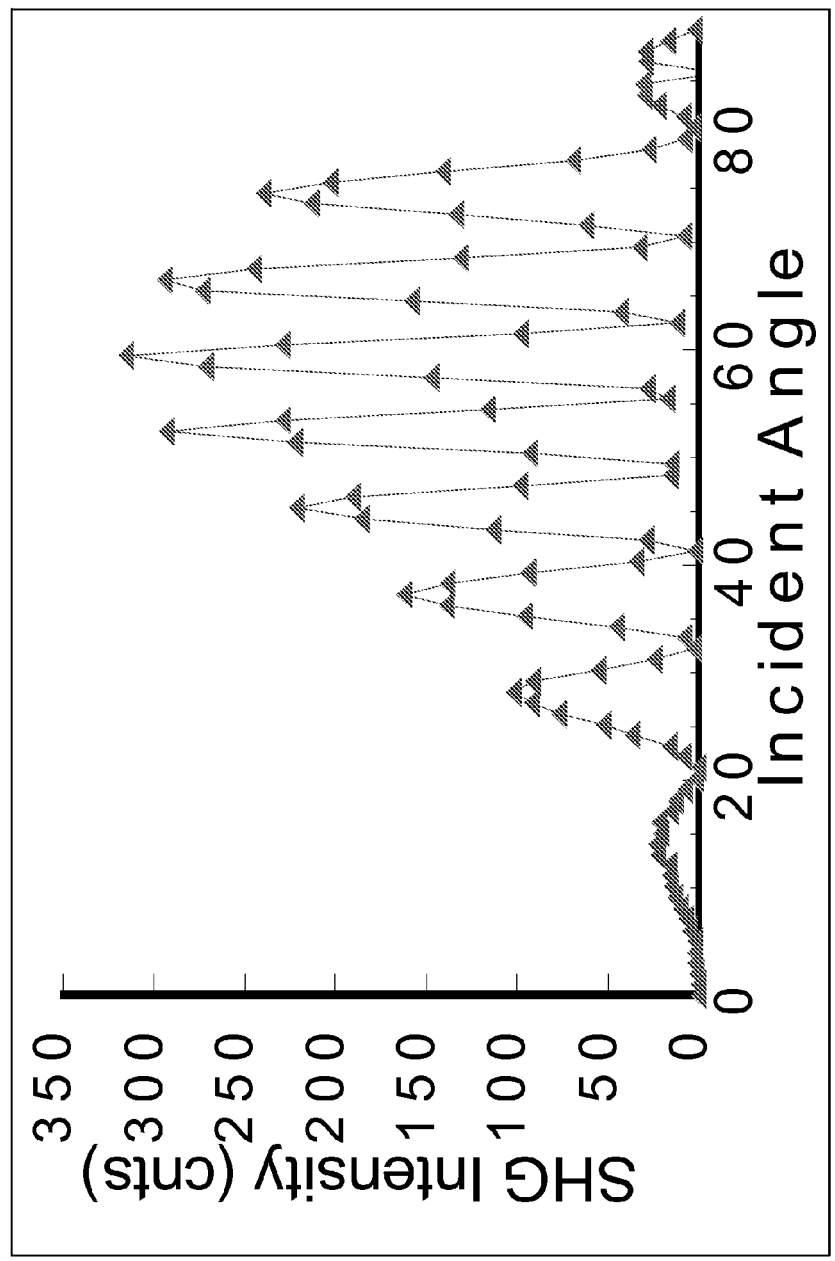
FIGS. 4D and 4E show variation in SHG intensity by incident angle for the conditions described in FIGS. 4A and 4C, respectively.
Figure 4E:
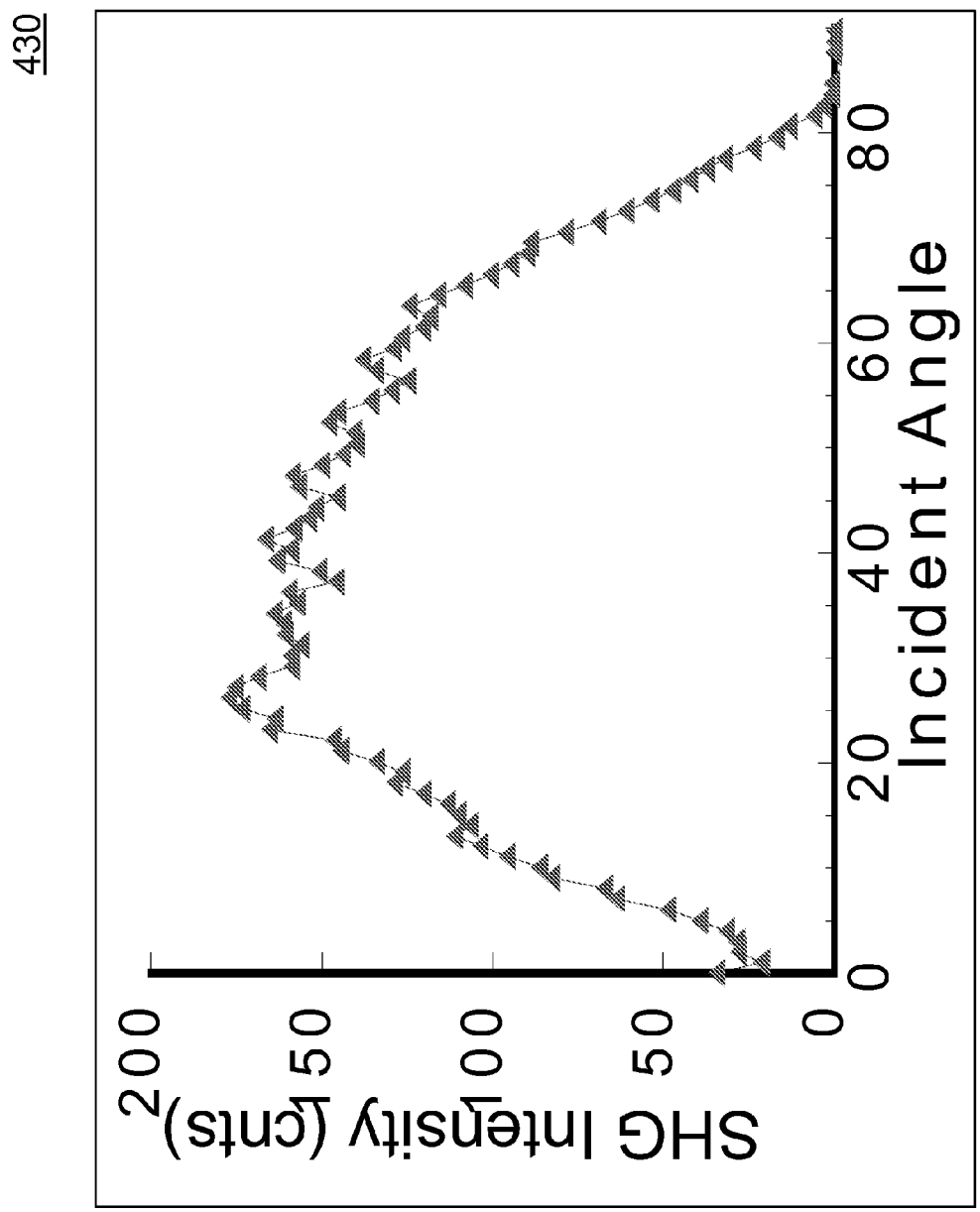

The insets 410 and 430 in FIGS. 4A and 4C, respectively, show Maker fringes (dependence of the SHG signal on incident angle) for the conventional films (inset 410 in FIG. 4A, expanded as FIG. 4D) and the hybrid films (inset 430 in FIG. 4C, expanded as FIG. 4E). The former exhibits regular fringes with 100% visibility due to angle-dependent phase matching between the two identical films on either side of the substrate. The fringes are superimposed on a single peaked envelope that has the same functional form from one sample to the next. In the hybrid case, there are no regular fringes, because the nanoparticles are deposited only on one side of the substrate. Furthermore, the Maker fringes in theses samples are irregular, with shapes that vary between samples and between different spots on the same sample. As a result, SHG conversion efficiency for the hybrid films has an uncertainty of about a factor of two. We believe that the likely origin of this irregularity lies in variations in the local orientation and quality of the nanoparticle arrays, so that the coupling of the laser to the LSPRs varies somewhat across the sample and as the incident angle is varied. A more systematic investigation of this phenomenon will be the subject of future work.

Figure 5:
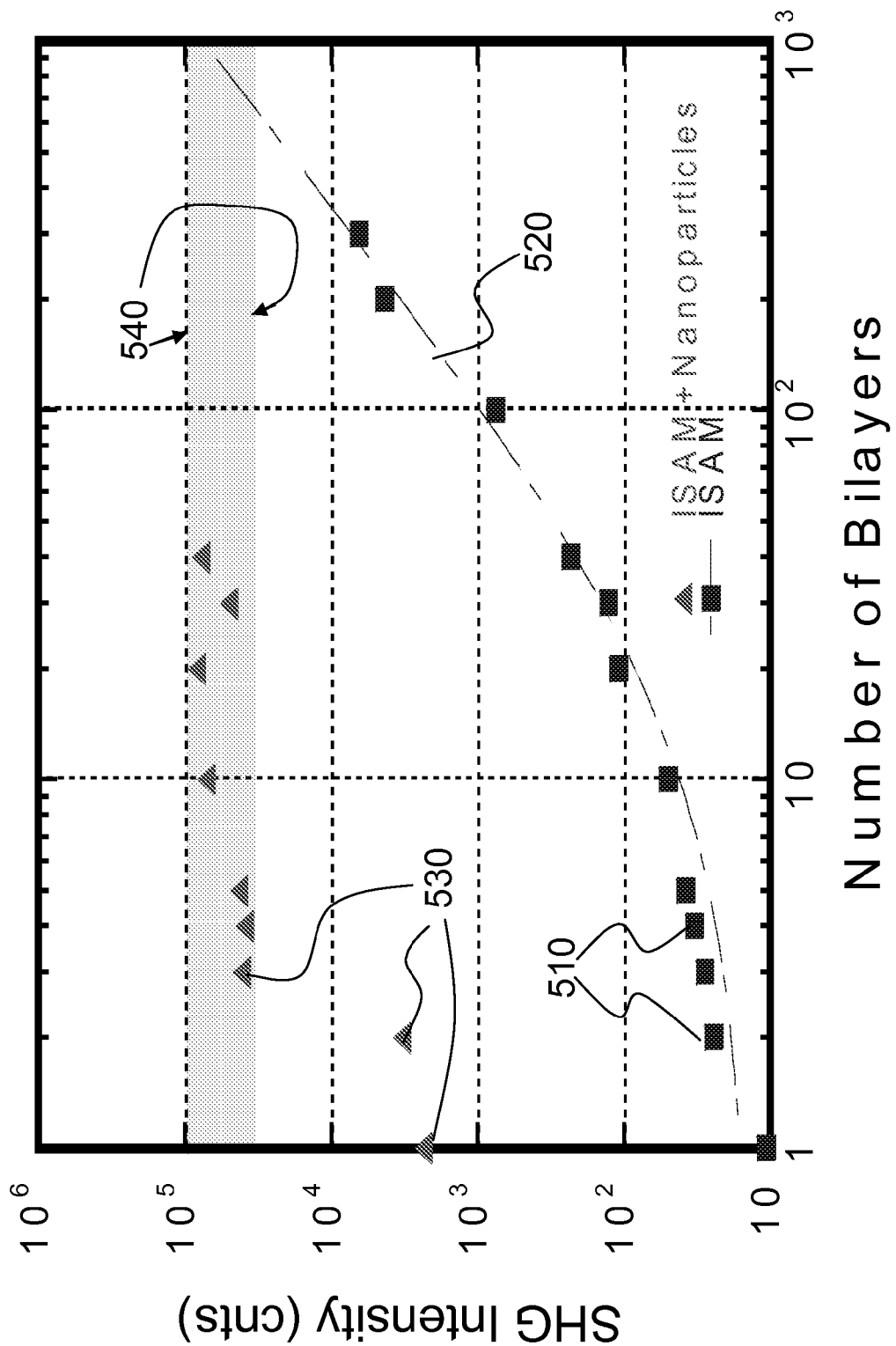
FIG. 5 is a graph comparing SHG conversion efficiencies in conventional and hybrid ISAM films of varying thickness.

LSPR modes are likely to penetrate only a few nm into the ISAM film. Since each ISAM bilayer is approximately 1.2 nm thick, we can expect that the greatest enhancements in NLO properties will occur for ISAM films that are only a few bilayers thick. To test this hypothesis, we prepared conventional ISAM films with up to 300 bilayers as well as hybrid films with up to 40 bilayers, and measured SHG conversion efficiency as described above. The results are shown in FIG. 5. Focusing first on the conventional films (squares 510), one would naïvely expect the SHG conversion efficiency to grow quadratically with film thickness, which is not the case, except for the thickest films. The additional SHG signal seen for thin films can be attributed to interface effects. The polarizability of the top and bottom bilayers is substantially higher than for those in the bulk of the film, and a better model for the SHG intensity is given by $I_{2\omega}=A[(N-2)+2B]^2 I_{\omega}^2$, where N is the number of bilayers and A and B are constants. The dashed line 520 indicates a fit of this model to the data, with $A=7.06\times 10^{-8}$, $B=8.59$.

For the hybrid films, the SHG signal 530 increases rapidly for the first three bilayers, and then levels off to within the uncertainty due to the variations in the quality and orientation of the nanoparticles discussed earlier (indicated by the band 540). This is precisely what we would expect, given that only the portion of the ISAM film that lies within the decay length of the most intense portion of the plasmon experiences significant field enhancement. We can then estimate this decay length to be of the order of the thickness of three ISAM bilayers, or ~3-4 nm. Because of this, the greatest enhancements in NLO coefficients is seen for the three bilayer film. At this thickness, the hybrid film generates 1600 times more SHG light than the conventional film, corresponding to an increase in $\chi^{(2)}$ of 40 times. Even more impressively, because the hybrid film takes maximum advantage of the interface enhancement, a conventional film would have to be 700-1000 bilayers thick in order to be as efficient as the three bilayer hybrid film.

It will be recalled from FIG. 1A that the optical nonlinearities lead to second harmonic generation (SHG) of light at 512 nm. FIG. 5 compares the intensity of this light from ISAM multilayer films with and without metallic nanoparticles deposited on top. The conventional films show the expected quadratic dependence of the SHG light on film thickness, where the deviation from this behavior at low film thickness is due to SHG from the interface. The MOH-ISAM film exhibits a rapid rise in SHG signal intensity for the first few bilayers, after which it stabilizes at a near constant level. The observed sample-to-sample variations seen in this intensity are attributed to variations in nanoparticle morphology and orientation, leading to varying coupling of incident radiation to the LSPRs. We should also mention that SHG emission from silver nanoparticles fabricated on a bare glass substrate was also measured, and was found to be lower than for the conventional ISAM film.

Embodiments 2, 3 and 4

2: nanoprismatic dimers deposited on an ISAM film. Add filler layer and repeat.

3: The nanoparticles are nanoaggregates that may be fabricated using one of the methods (1, 2 or 3) specified below, deposited on a surface. Add an inert filler and repeat.

4: The nanoparticles are nanoaggregates that may be fabricated using one of the methods (1, 2 or 3) specified below. The nanoaggregates are dispersed into a crosslinkable polymer matrix and are oriented into a polar configuration by an external electric field. The polymer is then cross linked, and the configuration is thus fixed even after the electric field is turned off.

Examples of chemical synthesis routes to metallic nanoparticles, that may be used to as a starting point for the nanoaggregate fabrication techniques described below.

We have employed two methods to date to synthesize silver and gold nanoparticles: (1) reducing chloroauric acid with salicylic acid process to make triangular gold nanoprisms, and (2) reducing $AgNO_3$ using ethylene glycol in the presence of PVP to make silver nanoparticles—spheres, wires, and cubes. For both sets of experiments, particles were characterized by SEM, dynamic light scattering, zeta potential measurements, and measurements of absorbance versus wavelength. The gold nanoprisms were synthesized according to the procedure of Malikova et al., described in Langmuir 18, 3694-7 (2002), and had a z-average diameter measured by dynamic light scattering of ~95 nm. At pH 9, the particles had a zeta potential ~−50 mV and were well dispersed. However, when the pH was lowered to ~6, the nanoprisms rapidly flocculated and settled due to a lower zeta potential. This illustrates the importance of controlling the interparticle potential and making sure that it is sufficiently repulsive so that the particles can be dispersed and effectively incorporated into NLO ISAM or hybrid films. While the thickness of the nanoprisms was not measured, the near transparency of the prism is consistent with a previously reported thickness of <10 nm. Finer control of nanoprism edge length should be readily achieved with more precise control of the pH and reagent concentrations during the reduction step and by varying the reaction time. Silver nanoparticles were synthesized according to the procedure of Xia et al., described in Angewandte Chemie—International Edition 44, 2154-7 (2005), using HCl as an etching agent to select for cubes and had a zeta potential of ~−40 mV. While these particles consisted of a mixture of spheres, wires, and cubes, we expect that further refinement of the procedure will lead to the reported high yields of cubes (>90%). In summary, these preliminary results demonstrate the feasibility of synthesizing gold and silver nanoparticles with the necessary size and shape to generate surface plasmons at wavelengths in the range of interest, 1000-1600 nm.

Anisotropic gold and silver particles with sizes less than 200 nm size can be synthesized and incorporated in MOH-ISAM materials. Particles with LSPRs in the 1000-1600 nm wavelength range are suitable for both telecommunications wavelengths (1300 and 1550 nm) as well as the wavelength of the Nd:YAG laser (1064 nm) that we use for materials characterization. Several related synthesis schemes may be employed. Triangular gold nanoprisms can be obtained with edge lengths in the range 50-200 nm by reducing chloroauric acid using several low molecular weight organic acids (such as salicylic acid and ascorbic acid) as capping agents to control particle shape. The seeded growth method of Millstone et al. J. Am. Chem. Soc. 127, 5312-3 (2005), can be used as an alternative approach to making gold nanoprisms effective in generating the desired surface plasmon effects. The target size is ~90-200 nm which corresponds to dipolar surface plasmons with wavelengths ranging from ~900-1300 nm. Triangular silver nanoprisms can be synthesized using known photochemical approaches. Spherical silver particles with diameter ~5 nm can be grown by reducing $AgNO3$ using $NaBH4$ in the presence of trisodium citrate. Then, nanoprisms will be grown from these seeds using a known dual-wavelength method to select for the growth of prisms with the most narrow size distribution. The target size range is 100-250 nm which corresponds to dipolar surface plasmons with wavelengths ranging from ~1000-1500 nm. Finally, silver-gold nanocages can be grown by first synthesizing silver nanocubes via the known polyol process using PVP as a capping agent and steric stabilizer. In a second step, these silver nanocubes can be partially converted to silver-gold nanocages to tune to a surface plasmon with a wavelength in the range 1000-1200 nm.

For all of these synthetic approaches, the particle size distribution (the mean size, the number of peaks and their breadth) can be characterized with a combination of SEM/TEM and dynamic light scattering. The size distribution can be controlled to some extent by varying the concentrations of reagents, the growth time, and, in the case of the photochemical processes, the wavelengths used to control growth. In order to facilitate the basic studies of the NLO processes and to fabricate prototype NLO EO modulators, it is desirable to make the particle size distribution as narrow as possible. The size distribution of the particles that ultimately are incorporated into the NLO films can be controlled by a combination of controlling growth conditions followed by centrifugation and filtration. For example, growing gold and silver nanoprisms frequently results in a mixture of nanoprisms of the desired edge length (typically 100-200 nm) and nanospheres with diameters <100 nm. Filtration can be done with a series of filters with pore sizes ranging from 100-1200 nm to fractionate particle mixtures and recover nanoprisms with the desired size range.

In order to incorporate the nanoparticles into ISAM films so that the particles can efficiently provide surface plasmon effects without excessive light scattering, the particles must (a) be dispersed to their primary particle size and (b) possess surface charges or reactive amine groups. Adequate particle dispersion can be achieved with a combination of electrostatic and steric stabilization. Gold nanoprisms grown with salicylic acid at pH~9 can be dispersed well at pH ~9 due to their zeta potential ~−50 mV. Effective electrostatic stabilization of particles typically requires zeta potentials greater than 25 mV in magnitude. In some cases, it will be desirable to reverse the sign of the nanoparticle charge. This can be readily done by first coating the particle with an oppositely charged polyelectrolyte and then washing away the nonadsorbed, excess polyelectrolyte by centrifugation and filtration. For some film experiments, described below, the particle surface can be terminated with a layer of reactive amines using the cationic polyelectrolyte polyallylamine hydrochloride (PAH) to covalently couple a layer of NLO-active Procion Brown dye to the particle surface.

MOH-ISAM Film Deposition and Aggregate Formation

As has already been mentioned, second order NLO materials must be globally non-centrosymmetric. This means that (i) the NLO-active building blocks of the materials must all be non-centrosymmetric, and (ii) the building blocks must be made to maintain a fixed orientation as they are assembled into a bulk material. In this section we concern ourselves with the first of these requirements. The building blocks we are interested in fall into two categories, thin films and aggregates.

Thin Films: (Alternative description of Embodiment 1, using a different method of fabrication for the nanoparticles—chemical synthesis rather than nanosphere lithography) This is the simplest approach to making MOH-ISAM materials. A thin ISAM film is deposited on a substrate, and is then decorated with metallic nanoparticles. Nanosphere lithography (NSL) was used in that case since that is a simple way of obtaining a well-controlled array of nanoparticles. However, NSL is not ideal for this purpose, since it forms a relatively sparse honeycomb lattice, creates heterogeneous and polycrystalline particles which therefore have differing LSPRs, and requires a vacuum deposition step which takes at least an hour to perform, so that building up a bulk structure with this technique is impractical. A more attractive route to MOH-ISAM thin film deposition would be to deposit nanoparticles synthesized as described in the previous section on top of NLO-active ISAM films. These particles can be made more mono-disperse, are naturally single-crystalline, and can be deposited from a suspension, saving significant processing time. The disadvantage is that such a scheme does not result in a periodic array of nanoparticles, which means that the natural suppression of light scattering that occurs in lattices with spacing smaller than the wavelength is absent. This may lead to undesirable scattering losses.

To overcome this potential problem, we deposit uniform, although not necessary regular, coatings of metallic nanoparticles on ISAM films. There are two reasons this will work well. First, the particles have a size of about 50-200 nm, which is significantly smaller than the desired wavelength range. To suppress scattering, it is sufficient to ensure that the density of scatterers is uniform when averaging over a volume the size of the wavelength, which is feasible if the particles are sufficiently small. Second, the metallic nanoparticles will be tailored to have a negative surface charge at pH 7, so they will repel one another as they are deposited on the surface at sufficiently low ionic strength. The surface arrangement will therefore not be entirely random, as particle clustering is avoided.

Aggregates: A more sophisticated approach to MOH-ISAM formation is to create composite particles of metal nanoparticles and ISAM films, which obviates the need for a separately deposited planar NLO-active film. Because the plasmon enhanced electric field extends only a few nanometers from the metal surface, conformally ISAM-coated metal particles make for a much more efficient use of NLO material. Such complexes are also known to exhibit particularly large enhancement factors. The formation of ISAM films on nano- and microparticle surfaces, as opposed to planar substrates, is now well-established and is easily performed using repeated centrifugation and filtration steps. However, most nanoparticles are symmetric under inversion, and such a structure would then be intrinsically centrosymmetric and lack $\chi^{(2)}$. To break the symmetry, we use two approaches.

Figure 6A:
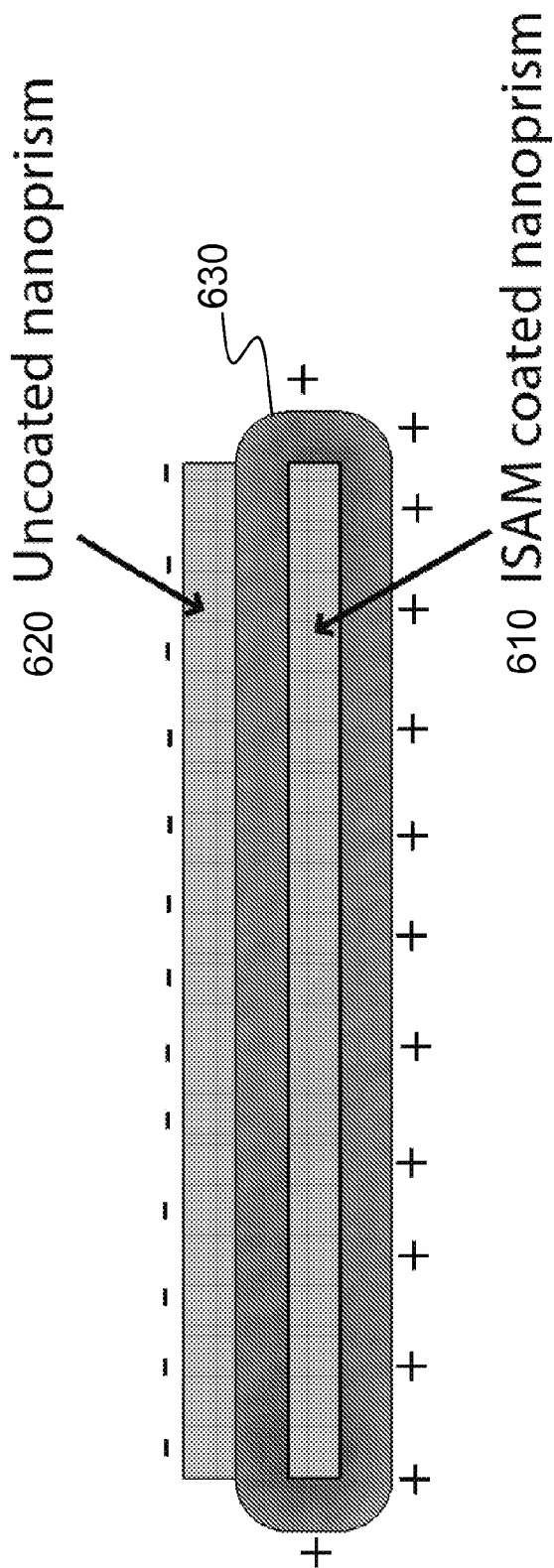
FIG. 6A is a schematic sideview of a nanoaggregate fabricated using Nanoaggregate fabrication approach 1.
Figure 6B:
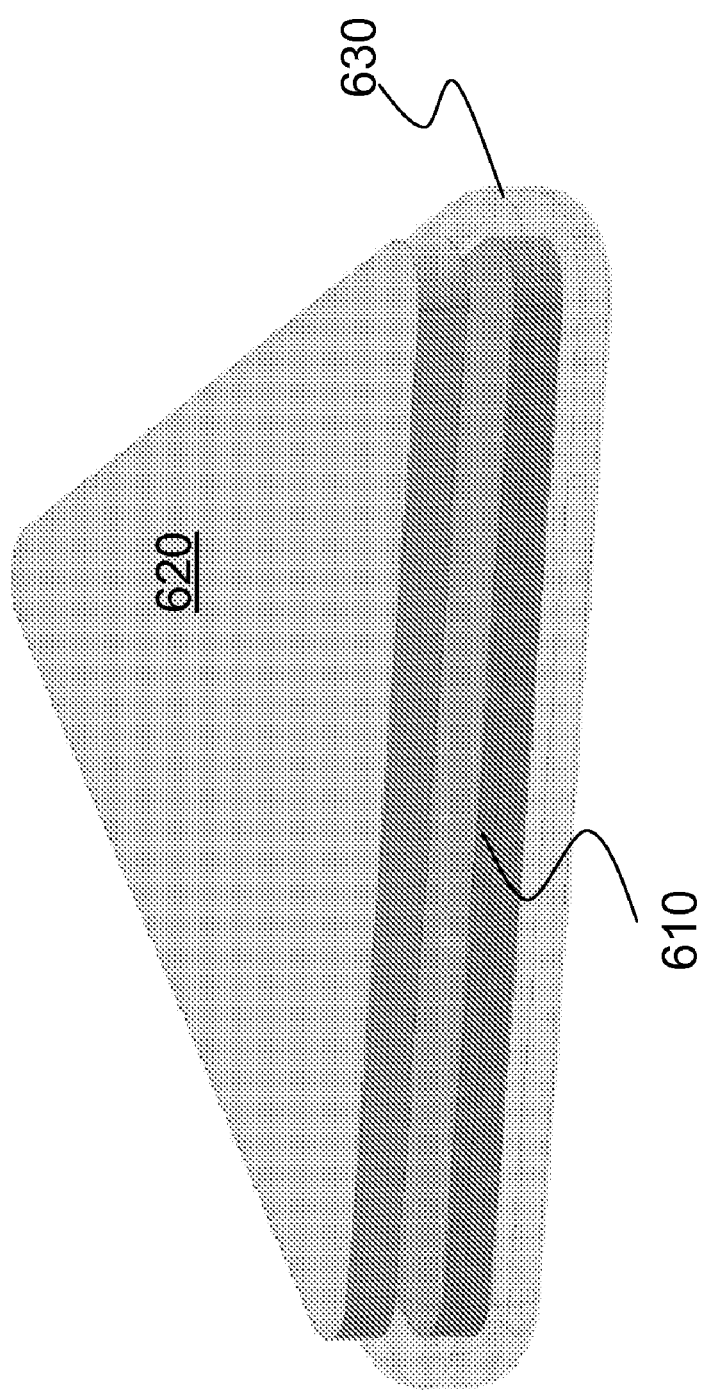
FIG. 6B is a schematic perspective view of a nanoaggregate fabricated using Nanoaggregate fabrication approach 1.

Nanoaggregate Fabrication Approach 1:

The first of these is to create dimers of coated and uncoated prism shaped metal particles. To be concrete we chose to use triangular prisms in this example, but other shapes are also possible. The ISAM-coated particles can be fabricated with a positively charged polycation, such as PAH, as its outermost layer. These can be deposited on a negatively charged substrate. We expect rapid deposition (within 1 minute) at readily achievable particle concentrations. The substrates, decorated with a fraction of a monolayer of coated particles will then be dipped into a suspension of negatively charged nanoparticles which will quickly adsorb only onto the positively charged coated particles. This naturally leads only to the formation of dimers and not to any higher order aggregates. If required, the particles can then be removed from the substrate using sonication, or by dissolving the substrate with the appropriate chemical, as further detailed in Nanofabrication approach 3, below. The resulting structure, shown schematically in FIGS. 6A and 6B, does not only lack inversion symmetry, but will exhibit stronger electromagnetic field enhancements than individual particles would. The field is at its strongest where the separation between the particles is the smallest, exactly the location where much of the ISAM film is deposited. The resonance frequency of the dimer is also very sensitive to the separation between the constituent particles. Since we have very accurate (sub-nanometer) control over the thickness of the ISAM film, this can be used to tune the resonance to the desired operating wavelength.

Nanoaggregagte Fabrication Approach 2:

A second approach to creating non-centrosymmetric MOH-ISAM aggregates is a modification of a technique for creating hemispherically asymmetric nanoparticles pioneered by Kuhl and colleagues, described in J. Phys. Chem A 110, 4538-42. Their goal was to separately functionalize opposite hemispheres of nanospheres in order to provide directional assembly of two or more particles. This was accomplished by spreading a monolayer of particles onto a substrate and then depositing a layer of metal by thermal evaporation or sputter coating. In this manner, only the upper half of each particle is coated with metal, which allows it to be functionalized separately from the lower half. In our work, we first deposit up to ten bilayer NLO ISAM films on the surface of spherical silver or gold nanoparticles. These coated nanoparticles are then spread as a monolayer onto a substrate.

Figure 7A:
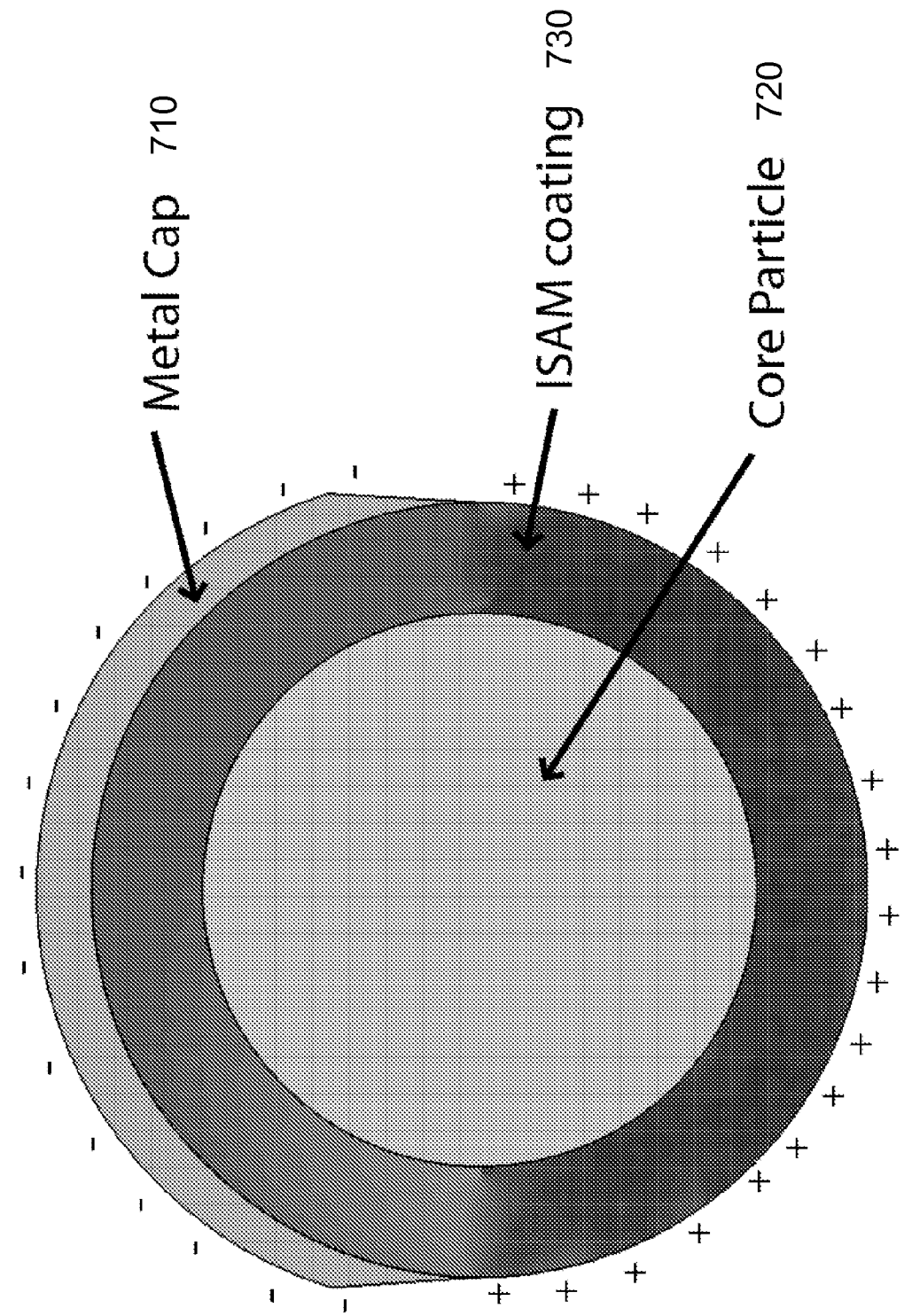
FIG. 7A is a schematic sideview of a nanoaggregate fabricated using Nanoaggregate fabrication approach 2.
Figure 7B:
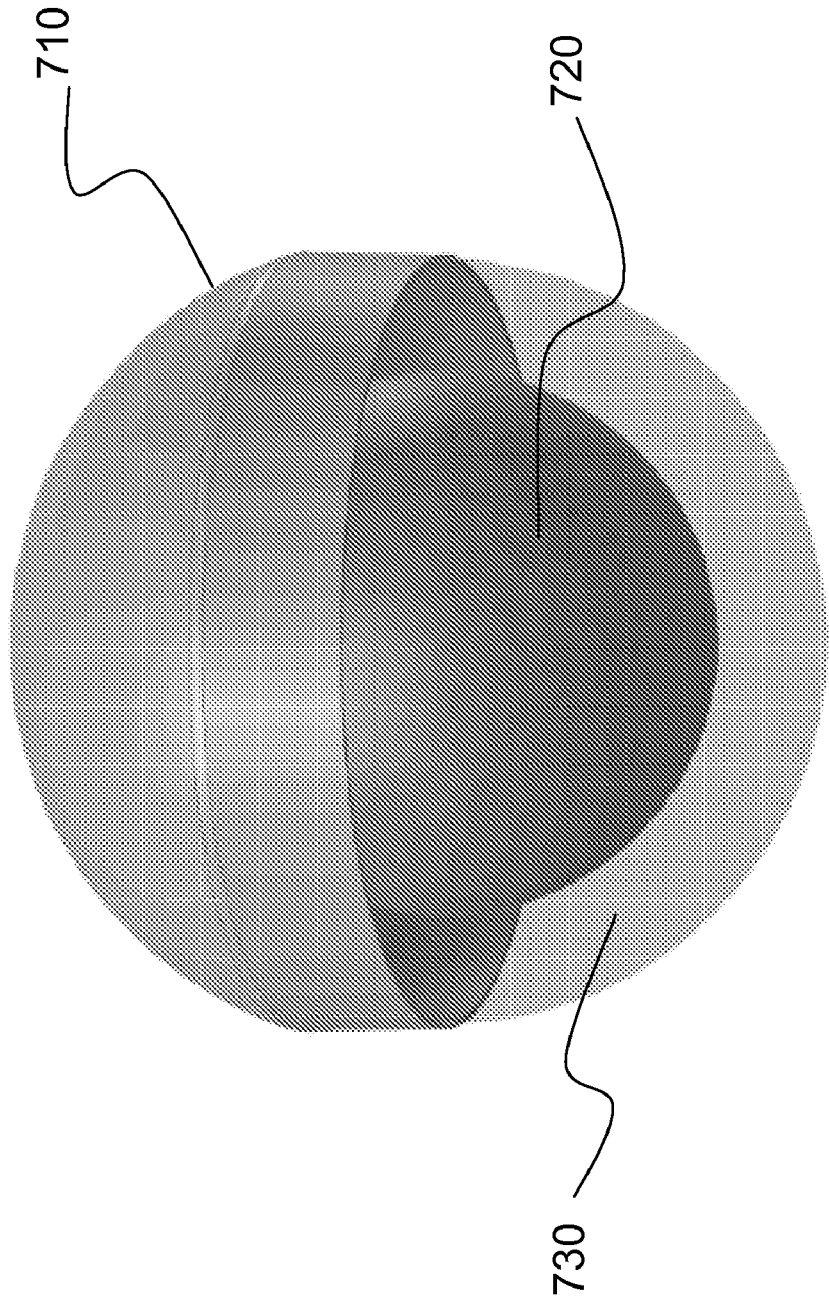
FIG. 7B is a schematic perspective view of a nanoaggregate fabricated using Nanoaggregate fabrication approach 2.

Thermal evaporation or sputtering of a silver or gold layer on the upper hemispherical surface of the nanoparticles followed by substrate release through sonication yield the final desired asymmetric ISAM-coated plasmonic nanoparticles, which are shown schematically in FIGS. 7A and 7B. As was the case for the dimers, the strongest electric field enhancements are localized in the ISAM filled gap between the core and the hemispherical cap. Also as in the dimers, the two hemispheres can be made electrically and chemically distinct by ensuring that the outermost ISAM layer is positively charged, giving the aggregate a net static electric dipole. In a variation of this method, the spherical nanoparticles may be made from a dielectric such as silicon or silicon dioxide. The resulting nanoaggregates will exhibit a smaller $\chi^{(2)}$ enhancement, but the frequency of the LSPR will be easier to control, and the electromagnetic properties of the particles will be more uniform.

Figure 8:
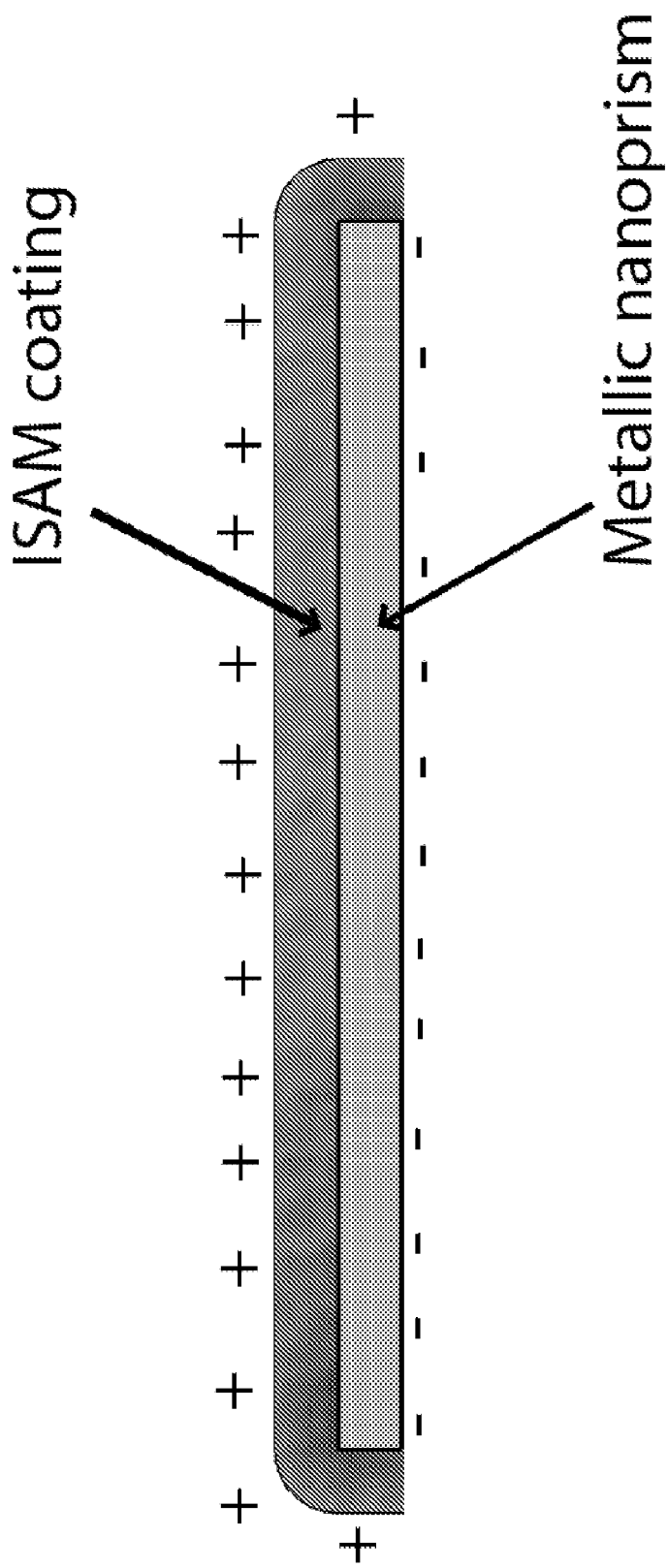
FIG. 8 is a schematic sideview of a nanoaggregate fabricated using Nanoaggregate fabrication approach 3.

Nanoaggregate fabrication approach 3: A third approach to creating non-centrosymmetric MOH-ISAM aggregates is to dip a charged substrate into an aqueous dispersion of nanoparticles. The substrate can be a material such as silicon or silicon dioxide that carries a natural surface charge. Alternatively, the surface may be covered with a polycation such as PAH (poly[alylamine hydrochloride]) to enhance nanoparticles adhesion. As a third alternative, the nanoparticles may be fabricated directly on the substrate with a technique such as nanophere lithography or electron beam lithography. The shape of the nanoparticles is not critical, as long as they have at least one flat surface (that is attached to the substrate), and posses a LSPR at the appropriate frequency. The second step is to passivate the charge on the substrate. The precise way to do this will vary depending on the surface chemistry, but if the substrate is terminated with an amine group, alkane carboxylic acids (such as butyric, valeric, or hexanoic acid) would cancel the surface charge, and inhibit deposition of ISMA films on the substrate between the nanoparticles. Next, an ISAM film is deposited on the nanoparticles using the standard dipping technique described above. The final step is to remove the nanoparticles from the surface, either by sonication, or by dissolving the top layer of the substrate using the appropriate chemical (such as plain water+sonication for the polymer, hydrogen fluoride for glass, or a potassium hydroxide solution for silicon). This results in non-centrosymmetric nanoparticles where only one side is coated with ISAM films, and the top and bottom sides may have opposite charges, as shown schematically in FIG. 8.

Materials Assembly (Relevant for Embodiments 2, 3 and 4 Described Below)

In order to make proper use of the MOH-ISAM materials, it is necessary to assemble them into bulk structures that can then be utilized in devices. There are several approaches toward this goal.

In addition to large $\chi^{(2)}$ values, the MOH-ISAM materials must also exhibit comparatively low optical loss to be of use for device applications. A useful figure of merit in this context is the ratio of $\chi^{(2)}$ to the loss coefficient. Therefore, we do not need to suppress losses as much as in conventional NLO materials, although it is clear this is an issue that needs to be addressed. There are two main sources of loss in these materials, scattering losses and ohmic losses. The former is due to the fact that the metallic nanoparticles and aggregates have strong Raleigh scattering coefficients, and therefore undesirable scattering of the incident light will occur if the particle or aggregate size is too large. Scattering can be suppressed completely if the scatterers are identical and placed on a regular lattice with lattice constant less than the wavelength. Because such an ideal arrangement is difficult to create, a different approach is to use the fact that the nanoparticles and aggregates are much smaller than the wavelength of the light. If they are placed densely throughout the material such that the density of scatterers when averaged over one wavelength is nearly constant, scattering will also be suppressed.

Ohmic losses pose a greater challenge since they are intrinsic to the metals used and can never be completely removed. But they can be minimized, first by a proper choice of materials (silver is the best choice), and second by designing the MOH-ISAM structures such that the penetration of the electromagnetic field into the metal is minimized. This is an obtainable goal, as is demonstrated by the existence of long-range SPP modes on thin metallic waveguides, which suffer more than an order of magnitude less attenuation than SPP modes on semi-infinite metallic surfaces.

An important goal is to fabricate MOH-ISAM bulk materials with $\chi^{(2)}$-values significantly higher than available today. To accomplish this it is necessary to distribute MOH-ISAM aggregates and/or films evenly throughout the materials in such a way that it retains overall non-centrosymmetry. Three strategies for accomplishing this are outlined in the descriptions of embodiments 2-4 below.

Embodiment 2

Film/Filler Superlattice

Figure 9:
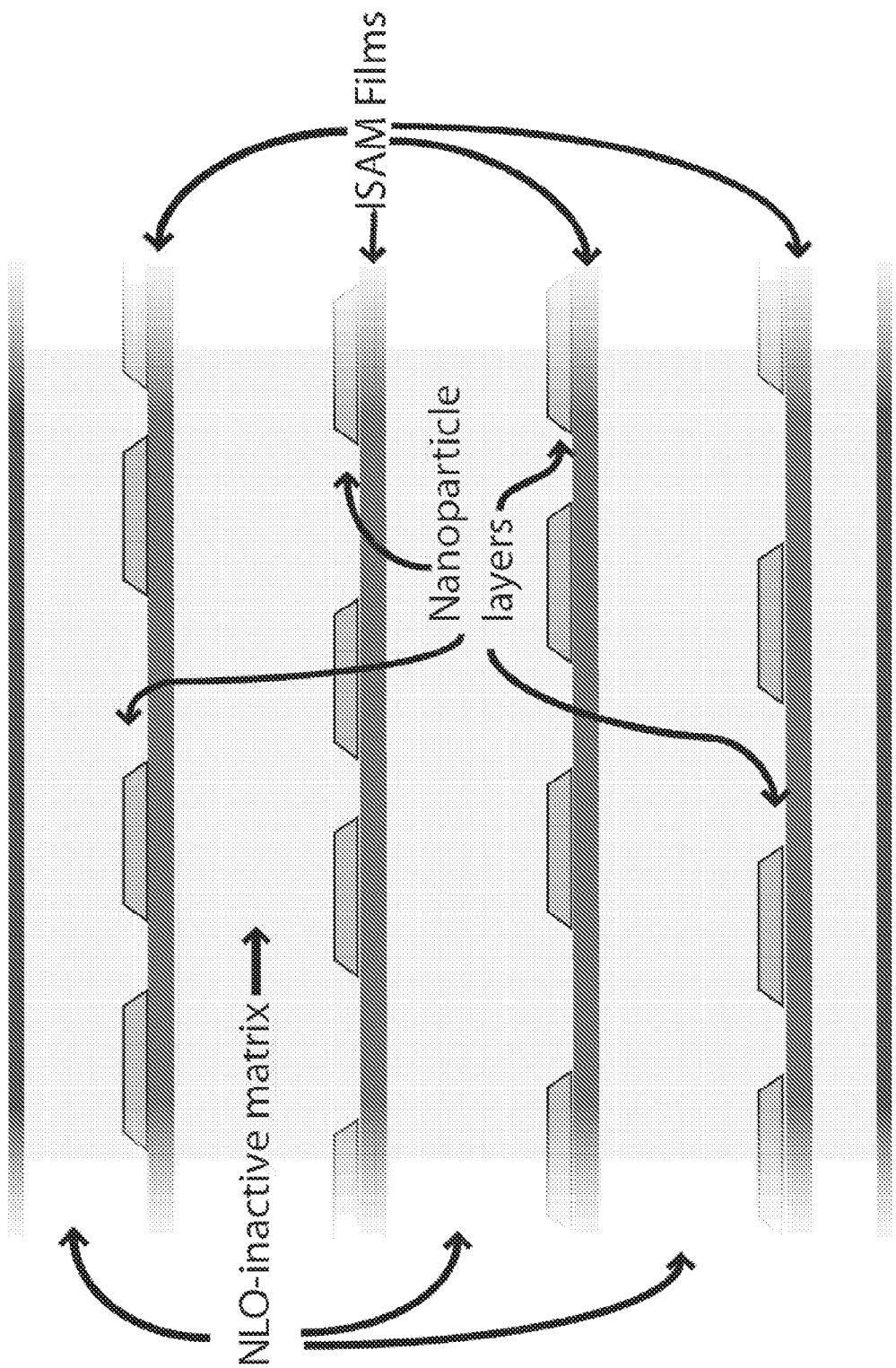
FIG. 9 is a schematic view of the 'film/filler superlattice' that constitute embodiment 2 of the invention.

In this method, an MOH-ISAM film is deposited on a substrate as just described in FIG. 1A (an NLO ISAM film is deposited first, followed by a layer of nanoparticles). After this step, an inert filler material such as PMMA, Cyclotene, or spin-on glass is spin cast on top of the film to encapsulate it. If necessary, the surface is then planarized, and another MOH-ISAM film is deposited. The process is repeated until a film of desired thickness is created. FIG. 9 displays a schematic view of the resulting material. The thickness of the filler should be the same in each cycle, and be small compared to the operating wavelength, so that scattering is minimized, but large compared to the plasmon decay length, so that the modes in different films do not interact. A thickness of 100-200 nm is an appropriate starting point.

Embodiment 3

Aggregate/Filler Superlattice

Figure 10:
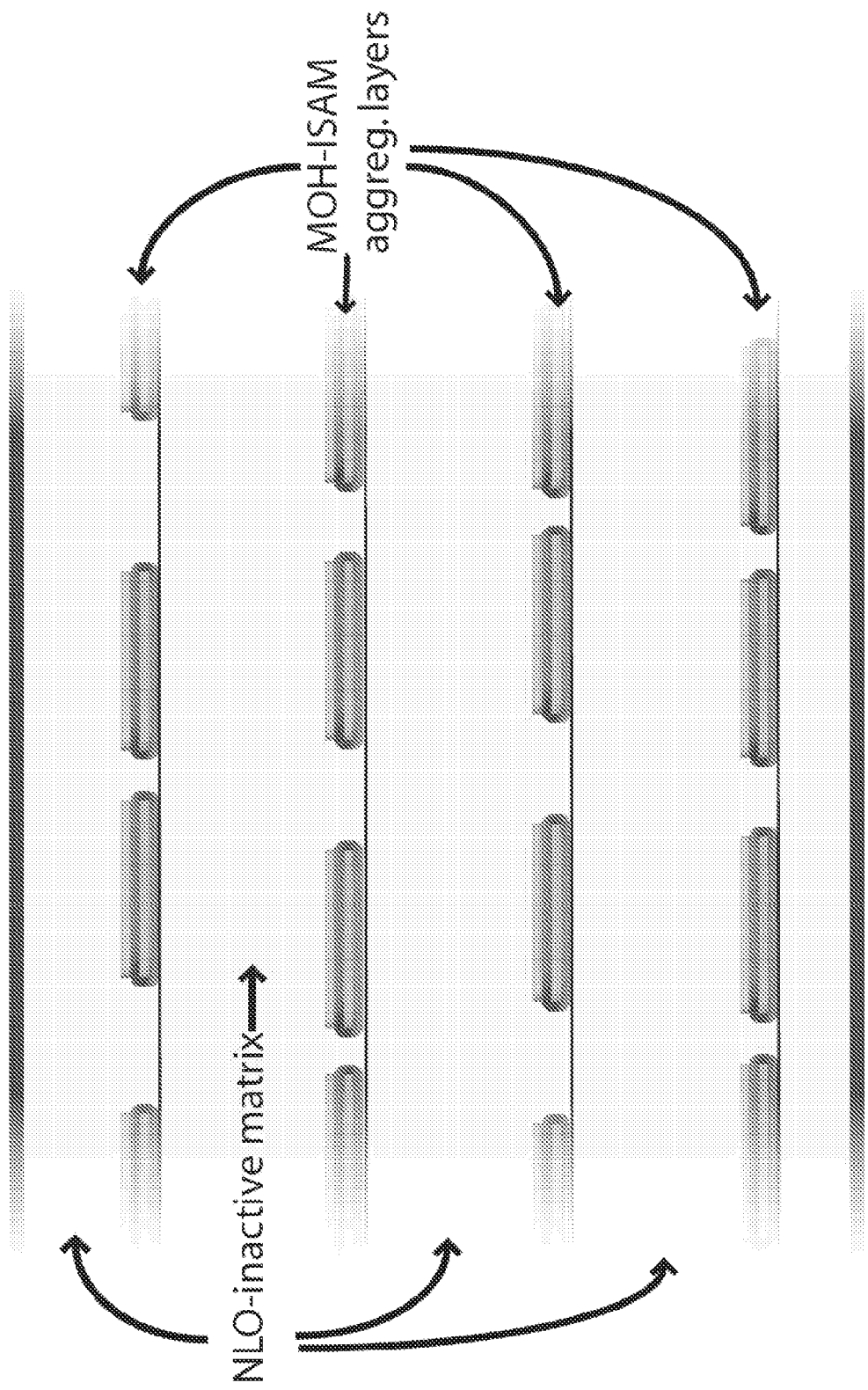
FIG. 10 is a schematic view of the 'aggregate/filler superlattice' that constitute embodiment 3 of the invention.

This embodiment is like the previous one, except that layers of MOH-ISAM aggregates are deposited, as illustrated in FIG. 1A, on the surface instead of separate ISAM and nanoparticles layers, which makes it faster and simpler to execute. If the surface is properly functionalized or charged, the aggregates will be deposited orientated so that the material becomes non-centrosymmetric. Some aggregates, such as those described in methods 2 and 3 above, will need to be assembled on a surface. Under those circumstances, it may be advantageous to perform the aggregate assembly in situ, exposing the substrate to each aggregate component in turn. FIG. 10 schematically illustrates the resulting material.

Embodiment 4

Poling of Aggregates in Filler Matrix

Figure 11:
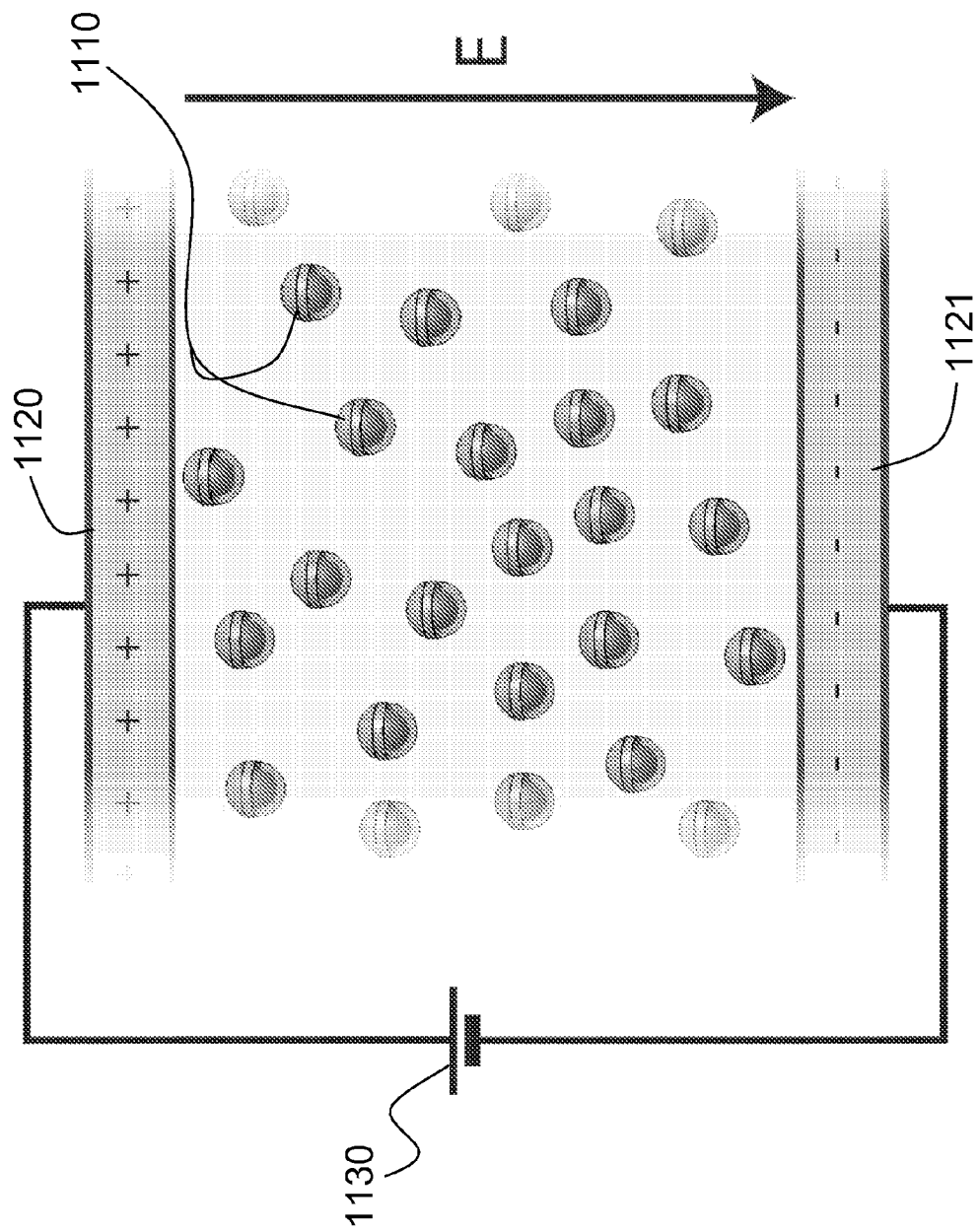
FIG. 11 is a schematic view of the 'poling of aggregates in filler matrix' that constitue embodiment 4 of the invention.

This embodiment differs from the previous two in that the full bulk material can be fabricated in a single step. MOH-ISAM aggregates are dispersed in an inert polymer matrix. An electric field is then applied, and since the aggregates are fabricated to have a net static dipole moment along their optically active direction, this will orient them in the material, creating polar, non-centrosymmetric order, as is illustrated by FIG. 11, which shows both the poled material (e.g. 1110) as well as the electrodes (1120, 1121) and power source 1130 used to achieve the polar orientation. The electrodes used to electrically pole the material are indicated in the sketch, but do not constitute a part of the resulting material. The polymer is then cross-linked, fixing the position and orientation of the aggregates. Due to the size (20-100 nm), weight ($10^8$-$10^9$ u), and stiffness of the MOH-ISAM aggregates, the energy barrier for rotating them in the cross-linked matrix is well beyond the energy scale kT of thermal fluctuations. These materials will therefore likely not lose their polar order over time, as the other electrically poled NLO materials tend to do.

Embodiment 5

Free Nanoaggregates for Use in Second Harmonic Imaging Microscopy and Related Applications In this embodiment of the invention, MOH-ISAM aggregates are used in a free dispersion, and are functionalized to act as markers in second harmonic imaging microscopy (SHIM). SHIM is an emerging microscopy technique with applications mainly in biology and biomedicine. It is similar to the better established technique of two-photon excitation fluorescence (TPEF) microscopy, but has the additional advantage of yielding information about the local structure of the tissue being studied as well as its spatial extent.

The starting point is a dispersion of MOH-ISAM nanoaggregates that may be fabricated using one of the methods (1, 2 or 3) described above. Since the surfaces on the top and bottom of the aggregates are different, the particles can be conjugated with antibodies or other compounds targeted at specific biological receptors such that only one side (top or bottom) becomes conjugated. For example, the outmost ISAM layer of the aggregate can be made amine terminated, which then can be linked to carboxyl groups on the chosen antibodies. The final step is to protect the unconjugated surfaces of the nanoparticles with a polyethylene glycol brush using well known methods. The result is a dispersion of nanoparticles that is stable against aggregation under biological conditions, and that is not susceptible to attacks by the immune system. These nanoparticles can then be used as highly efficient markers for SHIM studies of various types of tissues and cellular components.

It is clear that the combination of plasmonically active nanoparticles with second order NLO materials can be very fruitful, resulting in materials that have $\chi^{(2)}$ values well beyond those available today, thereby enabling optical switches and modulators of smaller dimensions than what is currently available, while at the same time substantially reducing the cost of fabrication of electro-optic devices.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A non-linear optical material comprising a plurality of non-centrosymmetric nanoparticles juxtaposed to non-linear optical (NLO) film at a localized surface Plasmon resonance (LSPR) of said nanoparticles, said LSPR being resonant at a wavelength of an incident light source, wherein a second-order non-linear susceptibility ($\chi^{(2)}$) of the NLO film with respect to the incident light is enhanced by the juxtaposition to the LSPR of the nanoparticles, the non-linear optical material not having global inversion symmetry.

2. A non-linear optical material as in claim 1, wherein the nanoparticles are deposited upon a layer of NLO film.

3. A non-linear optical material as in claim 1, wherein the NLO film is applied separately to each nanoparticle.

4. A non-linear optical material as in claim 3, wherein each nanoparticle is a prism, the NLO film is applied as a coating, and an uncoated nanoprism is attached to form a nano prism dimer.

5. A non-linear optical material as in claim 1, wherein each nanoparticle is a nanosphere, the NLO film is applied as a coating, and a metal cap is applied to a hemisphere of the nanoparticle.

6. A non-linear optical material as in claim 2, further comprising a plurality of said layers separated by an NLO-inactive filler.

7. A non-linear optical material as in claim 4, wherein the nanoprism dimers are arranged in a layer, and further comprising a plurality of said nanoprisms dimer layers separated by an NLO-inactive filler.

8. A non-linear optical material as in claim 5, wherein the capped nanospheres are aggregated in an electrically poled mixture.

9. A non-linear optical material as in claim 1, wherein said nanoparticles have a size less than 200 nm and a density sufficient to minimize scattering of the incident light.

10. A non-linear optical material as in claim 1, wherein each of said nanoparticles is of the same noble metal, the noble metal being one of the group comprised of gold, silver, copper and platinum.

11. A non-linear optical material, comprising:
an ionic self-assembled multilayer (ISAM) film, the ISAM film having a non-zero second-order non-linear optical susceptibility $\chi^{(2)}$; and
metallic nanoparticles deposited on the ISAM film, the metallic nanoparticles having one or more localized plasmon resonances (LSPRs), said LSPRs being determined by a geometry of the metallic nanoparticles,
wherein the geometry of the metallic nanoparticles is tuned to make at least one of the LSPRs overlap a frequency of optical excitation applied to the non-linear optical material, thereby enhancing a second harmonic generation (SHG) emission, responsive to said optical excitation, in proportion to an enhancement responsive to said at least one LSPRs.

12. The non-linear optical material of claim 11, wherein the metallic nanoparticles are silver nanoparticles.

13. The non-linear optical material of claim 11, wherein the metallic nanoparticles are deposited by nanosphere lithography.

14. The non-linear optical material of claim 11, wherein the geometry of the metallic nanoparticles is a triangular prism.

15. The non-linear optical material of claim 11, wherein the geometry of the metallic nanoparticles is a nanocage.

16. The non-linear optical material of claim 11, wherein the frequency of optical excitation is in the range of 1000 to 1600 nm.

17. The non-linear optical material of claim 11, wherein the metallic nanoparticles are less than 200 nm in size.

18. A method of producing a non-linear optical material, comprising:
forming an ionic self-assembled multilayer (ISAM) film, the ISAM film having a non-zero second-order non-linear optical susceptibility $\chi^{(2)}$; and
depositing metallic nanoparticles on the ISAM film, the metallic nanoparticles having one or more localized plasmon resonances (LSPRs), said LSPRs being determined by a geometry of the metallic nanoparticles,
wherein the geometry of the metallic nanoparticles is tuned to make at least one of the LSPRs overlap a frequency of optical excitation applied to the non-linear optical material, thereby enhancing a second harmonic generation (SHG) emission, responsive to said optical excitation, in proportion to an enhancement responsive to said at least one LSPRs.

19. A method of producing non-linear optical material as in claim 18, wherein the metallic nanoparticles are silver nanoparticles.

20. A method of producing non-linear optical material as in claim 18, wherein the metallic nanoparticles are deposited by nanosphere lithography.

21. A method of producing non-linear optical material as in claim 18, wherein the geometry of the metallic nanoparticles is a triangular prism.

22. A method of producing non-linear optical material as in claim 18, wherein the geometry of the metallic nanoparticles is a nanocage.

23. A method of producing non-linear optical material as in claim 18, wherein the frequency of optical excitation is in the range of 1000 to 1600 nm.

24. A method of producing non-linear optical material as in claim 18, wherein the metallic nanoparticles are less than 200 nm in size.

25. A method of producing non-linear optical material as in claim 18, wherein the ISAM film is formed on one side of a glass substrate.

26. A non-linear optical material as in claim 4, wherein the nanoprism dimers are conjugated with antibodies targeted at a biological receptor.

* * * * *